(12) United States Patent
Roper et al.

(10) Patent No.: US 12,547,983 B1
(45) Date of Patent: Feb. 10, 2026

(54) ELIMINATION OF LEGACY DATA OBJECTS VIA DATA COMPRESSION

(71) Applicant: Chicago Mercantile Exchange Inc., Chicago, IL (US)

(72) Inventors: James W. Roper, Chicago, IL (US); Naresha Chari, Chicago, IL (US); Romil Parekh, Northbrook, IL (US); Dhiraj Bawadhankar, Naperville, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 48 days.

(21) Appl. No.: 18/614,275

(22) Filed: Mar. 22, 2024

(51) Int. Cl.
*G06Q 10/10* (2023.01)

(52) U.S. Cl.
CPC ................... *G06Q 10/10* (2013.01)

(58) Field of Classification Search
CPC ....................................... G06Q 10/00
USPC ........................................ 705/3–44
See application file for complete search history.

(56) References Cited

U.S. PATENT DOCUMENTS

| | | | |
|---|---|---|---|
| 5,068,816 A | 11/1991 | Noetzel | |
| 5,274,813 A | 12/1993 | Itoh | |
| 5,644,727 A | 7/1997 | Atkins | |
| 5,978,511 A | 11/1999 | Horiuchi et al. | |
| 6,064,985 A | 5/2000 | Anderson | |
| 6,278,981 B1 | 8/2001 | Dembo et al. | |
| 6,282,520 B1 | 8/2001 | Schirripa | |
| 6,304,858 B1 | 10/2001 | Mosler et al. | |
| 6,317,727 B1 | 11/2001 | May | |
| 6,333,788 B1 | 12/2001 | Yamada et al. | |
| 6,385,249 B1 | 5/2002 | Kondo et al. | |
| 6,424,972 B1 | 7/2002 | Berger et al. | |
| 7,181,422 B1 | 2/2007 | Philip et al. | |
| 7,222,317 B1 | 5/2007 | Mathur et al. | |
| 7,236,952 B1 | 6/2007 | D'Zmura | |
| 7,349,878 B1 | 3/2008 | Makivic | |

(Continued)

FOREIGN PATENT DOCUMENTS

| | | |
|---|---|---|
| CA | 2587177 A1 | 11/2008 |
| WO | 0150776 A2 | 7/2001 |

(Continued)

OTHER PUBLICATIONS

Baldeep Singh et al/. "Cloud based evaluation of databases for stock market data", Sing et al Journal of Cloud Computing, https://doi.org/10.1186/s13677-022-00323-4, (Year: 2022).*

(Continued)

*Primary Examiner* — Frantzy Poinvil
(74) *Attorney, Agent, or Firm* — Lempia Summerfield Katz LLC

(57) ABSTRACT

A system includes data compression logic for compression of legacy data objects defining transactions that reference inactive rate indices. The data compression logic identifies a non-legacy participant data object that defines a participant flow that is matched in magnitude and opposite in polarity to a net legacy flow associated with one or more legacy data objects. The data compression logic applies data compression by cross-linking the participant data object to the one or more legacy data objects and removing the participant data object to the one or more legacy data objects responsive to the cross-linking.

20 Claims, 5 Drawing Sheets

(56) References Cited

U.S. PATENT DOCUMENTS

| | | |
|---|---|---|
| 7,430,539 B2 | 9/2008 | Glinberg et al. |
| 7,509,275 B2 | 3/2009 | Glinberg et al. |
| 7,565,316 B1 | 7/2009 | Amin et al. |
| 7,580,876 B1 | 8/2009 | Phillips et al. |
| 7,587,641 B1 | 9/2009 | Sloane et al. |
| 7,702,563 B2 | 4/2010 | Balson et al. |
| 7,734,538 B2 | 6/2010 | Bauerschmidt et al. |
| 7,801,810 B2 | 9/2010 | Glinberg |
| 7,809,631 B2 | 10/2010 | Bauerschmidt et al. |
| 7,822,668 B1 | 10/2010 | Benda |
| 7,870,052 B1 | 1/2011 | Goldberg et al. |
| 7,870,060 B2 | 1/2011 | Barker et al. |
| 7,930,245 B2 | 4/2011 | Glinberg |
| 7,987,126 B2 | 7/2011 | Connors |
| 8,010,441 B2 | 8/2011 | Brouwer |
| 8,108,281 B2 | 1/2012 | Koblas et al. |
| 8,165,942 B1 | 4/2012 | Rordorf |
| 8,255,313 B2 | 8/2012 | Kraus et al. |
| 8,301,537 B1 | 10/2012 | Rachev et al. |
| 8,494,953 B1* | 7/2013 | Boberski ............... G06Q 40/04 705/37 |
| 8,515,058 B1 | 8/2013 | Gentry |
| 8,725,621 B2 | 5/2014 | Marynowski et al. |
| 8,751,372 B1 | 6/2014 | Friedman et al. |
| 8,805,735 B1 | 8/2014 | Goldberg et al. |
| 8,862,560 B1 | 10/2014 | Wu et al. |
| 8,965,804 B2 | 2/2015 | Connors |
| 9,396,131 B1 | 7/2016 | Hendry et al. |
| 10,140,659 B2 | 11/2018 | Xythalis |
| 10,203,879 B2 | 2/2019 | Yamato et al. |
| 10,319,032 B2 | 6/2019 | Zhan et al. |
| 10,326,862 B2 | 6/2019 | Bonig |
| 10,475,123 B2 | 11/2019 | Bawadhankar |
| 10,572,939 B1 | 2/2020 | Bawadhankar et al. |
| 10,609,172 B1 | 3/2020 | Sharaby et al. |
| 10,650,457 B2 | 5/2020 | Bawadhankar et al. |
| 10,748,212 B2 | 8/2020 | Xythalis et al. |
| 10,789,588 B2 | 9/2020 | Burnham et al. |
| 10,884,988 B2 | 1/2021 | Chuprun et al. |
| 10,896,467 B2 | 1/2021 | Bawadhankar et al. |
| 10,992,766 B2 | 4/2021 | Sharaby et al. |
| 11,004,148 B2 | 5/2021 | Zhan et al. |
| 11,494,397 B1* | 11/2022 | Sharma ............... G06F 16/2386 |
| 2002/0002528 A1 | 1/2002 | Terada et al. |
| 2002/0038272 A1 | 3/2002 | Menchero |
| 2002/0138386 A1 | 9/2002 | Maggioncalda et al. |
| 2003/0028466 A1 | 2/2003 | Jenson et al. |
| 2003/0036918 A1 | 2/2003 | Pintsov |
| 2003/0055777 A1 | 3/2003 | Ginsberg |
| 2003/0061577 A1 | 3/2003 | Saluja et al. |
| 2003/0101026 A1 | 5/2003 | Rabinowitz et al. |
| 2003/0204462 A1 | 10/2003 | Eisler |
| 2003/0236738 A1 | 12/2003 | Lange et al. |
| 2004/0177023 A1 | 9/2004 | Krowas et al. |
| 2004/0186804 A1 | 9/2004 | Chakraborty et al. |
| 2004/0199448 A1 | 10/2004 | Chalermkraivuth et al. |
| 2004/0205457 A1 | 10/2004 | Bent et al. |
| 2004/0220870 A1 | 11/2004 | Lundberg et al. |
| 2005/0050372 A1 | 3/2005 | Hagiwara |
| 2005/0055301 A1 | 3/2005 | Cohen et al. |
| 2005/0096950 A1 | 5/2005 | Caplan et al. |
| 2005/0097029 A1 | 5/2005 | Cooper |
| 2005/0187855 A1 | 8/2005 | Brennan et al. |
| 2005/0192898 A1 | 9/2005 | Hache |
| 2005/0256799 A1* | 11/2005 | Warsaw ............... G06Q 40/06 705/37 |
| 2006/0059067 A1 | 3/2006 | Glinberg et al. |
| 2006/0112049 A1 | 5/2006 | Mehrotra et al. |
| 2006/0224494 A1 | 10/2006 | Pinkava |
| 2006/0259378 A1 | 11/2006 | Fornasari |
| 2007/0033123 A1 | 2/2007 | Navin |
| 2007/0083458 A1 | 4/2007 | Rosenthal et al. |
| 2007/0083586 A1 | 4/2007 | Luo et al. |
| 2007/0118459 A1 | 5/2007 | Bauerschmidt et al. |
| 2007/0136267 A1* | 6/2007 | Hess ............... G06F 16/24575 |
| 2007/0156555 A1 | 7/2007 | Orr |
| 2007/0186206 A1 | 8/2007 | Abrams et al. |
| 2007/0192221 A1 | 8/2007 | Sandor et al. |
| 2007/0198387 A1 | 8/2007 | Uenohara et al. |
| 2007/0239589 A1 | 10/2007 | Wilson, Jr. et al. |
| 2007/0244785 A1 | 10/2007 | Williams |
| 2007/0244788 A1 | 10/2007 | Ferris |
| 2007/0271204 A1 | 11/2007 | Jiang |
| 2007/0288351 A1 | 12/2007 | Huntley |
| 2008/0120251 A1 | 5/2008 | Tyagi et al. |
| 2008/0183615 A1 | 7/2008 | Rio et al. |
| 2008/0196076 A1 | 8/2008 | Shatz et al. |
| 2008/0235172 A1 | 9/2008 | Rosenstein et al. |
| 2008/0249956 A1 | 10/2008 | Connors |
| 2008/0249958 A1 | 10/2008 | Anguish et al. |
| 2008/0294571 A1 | 11/2008 | Maloney et al. |
| 2008/0319920 A1 | 12/2008 | Levin et al. |
| 2009/0138536 A1 | 5/2009 | Chao et al. |
| 2009/0171826 A1 | 7/2009 | Hadi et al. |
| 2009/0216824 A1 | 8/2009 | Weinberg et al. |
| 2009/0248564 A1 | 10/2009 | Fallon et al. |
| 2009/0265284 A1 | 10/2009 | Rowell |
| 2009/0281956 A1 | 11/2009 | An et al. |
| 2009/0299910 A1 | 12/2009 | Khuong-huu et al. |
| 2009/0307124 A1 | 12/2009 | Meyerhoff |
| 2009/0327160 A1 | 12/2009 | Perry et al. |
| 2010/0106633 A1 | 4/2010 | Iyer et al. |
| 2010/0138362 A1 | 6/2010 | Whitehurst |
| 2010/0145875 A1 | 6/2010 | Schmid et al. |
| 2010/0185559 A1 | 7/2010 | May |
| 2010/0191628 A1 | 7/2010 | Arnott et al. |
| 2010/0259204 A1 | 10/2010 | Imura |
| 2010/0280970 A1 | 11/2010 | Lai et al. |
| 2010/0281086 A1 | 11/2010 | Ganai et al. |
| 2010/0323350 A1 | 12/2010 | Gordon et al. |
| 2010/0328530 A1 | 12/2010 | Hashimoto et al. |
| 2011/0004568 A1 | 1/2011 | Phillips et al. |
| 2011/0035342 A1 | 2/2011 | Koblas et al. |
| 2011/0060603 A1 | 3/2011 | Capelli et al. |
| 2011/0153521 A1 | 6/2011 | Green et al. |
| 2011/0161244 A1 | 6/2011 | Iyer et al. |
| 2011/0179112 A1 | 7/2011 | Ravichandran et al. |
| 2011/0221489 A1 | 9/2011 | Tarng et al. |
| 2012/0016784 A1 | 1/2012 | Mintz et al. |
| 2012/0254008 A1 | 10/2012 | Brady |
| 2012/0296793 A1 | 11/2012 | Wilson, Jr. et al. |
| 2012/0317011 A1 | 12/2012 | Duquette |
| 2013/0018769 A1 | 1/2013 | Boudreault et al. |
| 2013/0018818 A1 | 1/2013 | Yadav |
| 2013/0036074 A1 | 2/2013 | Kaestel |
| 2013/0041799 A1 | 2/2013 | Nyhoff et al. |
| 2013/0041843 A1 | 2/2013 | Nyhoff et al. |
| 2013/0117197 A1 | 5/2013 | Shah et al. |
| 2013/0241933 A1 | 9/2013 | Thatcher et al. |
| 2013/0282547 A1 | 10/2013 | Nyhoff et al. |
| 2013/0282554 A1 | 10/2013 | Boberski |
| 2013/0339272 A1 | 12/2013 | Willism, III |
| 2014/0023167 A1 | 1/2014 | Meyer |
| 2014/0025552 A1 | 1/2014 | Hirani et al. |
| 2014/0032443 A1 | 1/2014 | Ossanna et al. |
| 2014/0067639 A1 | 3/2014 | Macwilliams |
| 2014/0229351 A1 | 8/2014 | Lutnick et al. |
| 2014/0236798 A1 | 8/2014 | Feilbogen et al. |
| 2014/0258072 A1 | 9/2014 | Mayor et al. |
| 2014/0279364 A1 | 9/2014 | Sandhu et al. |
| 2015/0026028 A1 | 1/2015 | Davies et al. |
| 2015/0039530 A1 | 2/2015 | Jha et al. |
| 2015/0063374 A1 | 3/2015 | Venkatachalam Jayaraman et al. |
| 2015/0324914 A1 | 11/2015 | Zhan et al. |
| 2015/0365619 A1 | 12/2015 | Mayer et al. |
| 2016/0035024 A1 | 2/2016 | Yin et al. |
| 2016/0078565 A1* | 3/2016 | Farrell ............... G06Q 10/10 705/30 |
| 2016/0179853 A1 | 6/2016 | Bertin et al. |
| 2016/0246266 A1 | 8/2016 | Kniazev et al. |
| 2016/0285571 A1 | 9/2016 | Badiu et al. |
| 2017/0061329 A1 | 3/2017 | Kobayashi et al. |
| 2018/0247191 A1 | 8/2018 | Katz et al. |
| 2020/0356990 A1 | 11/2020 | Burnham et al. |

(56) References Cited

U.S. PATENT DOCUMENTS

| | | | |
|---|---|---|---|
| 2021/0097620 | A1 | 4/2021 | Bawadhankar et al. |
| 2021/0211516 | A1 | 7/2021 | Sharaby et al. |
| 2021/0217086 | A1 | 7/2021 | Zhan et al. |
| 2022/0391099 | A1 | 12/2022 | Cooper et al. |
| 2025/0029112 | A1* | 1/2025 | Avusingi ............... G06F 16/258 |

FOREIGN PATENT DOCUMENTS

| | | | |
|---|---|---|---|
| WO | 2006103474 | A2 | 10/2006 |
| WO | 2009070690 | A1 | 6/2009 |
| WO | 2012024504 | A2 | 2/2012 |

OTHER PUBLICATIONS

Holger Englisch et al., "Deep treasury management for banks", Frontiers in Artificial intelligence, Mar. 22, 2023.*

"Bloomberg Creates First NDF Clearing Link from FXGO to CME Group", Business Wire, Jul. 10, 2012. (Year: 2012).

"Getting Smarter Series—Overnight Index Swaps (OIS)", DSP Mutual Fund, 7 pages, 2014.

"Impact Netting on Credit, Liquidity and Systemic Risk", ifci, Switzerland, pp. 1-7, Feb. 1, 2001.

"Introducing Amazon API Gateway", Jul. 9, 2015. (Year: 2015).

"Introducing AWS Lambda", Nov. 13, 2014. (Year: 2014).

"MFX: Understanding Cross Currency Swaps", Web archives, pp. 1-6, Nov. 14, 2008.

"Part II: Commodity Futures Trading Commission", Federal Register, vol. 76, No. 216, pp. 69334-69480, Nov. 8, 2011.

"The Commodity Futures Trading Commission Holds a Meeting of the Technology Advisory Committee", Jun. 22, 2012, Political Transcript Wire, Journal Cose: PTTW.

"TriOptima and LCH.Clearnet Compression of Cleared Interest Rate Swaps Exceeds $100 Trillion in Notational; $20.4 Trillion Compressed in 2012 Alone", ICAP, 2 pages, http://www.icap.com/news/2012/trioptima-swap-clear-usd100-trillion.aspx, Feb. 23, 2012.

Abdelkhalek et al., "Parallelization, Optimization, and Performance Analysis of Portfolio Choice Models", International Conference on Parallel Processing, pp. 277-286, 2001, Valencia, Spain.

Anella Munro et al., "Motivations for Swap-Covered Foreign Currency Borrowing", BIS Papers No. 52, pp. 145-185, Aug. 2009.

Bill Hodgson, Price Alignment Interest, OTC Space, 6 pages, Oct. 5, 2012.

Christopher Whiteley, "G-20 Reforms, Hedging and Cover Bonds", Capital Markets Law Journal, vol. 7, No. 2, pp. 151-168, 2012.

Daniel Kurt, "Secured Overnight Financing Rate (SOFR) Definition and History", Investopedia, 4 pages, https://www.investopedia.com/secured-overnight-financing-rate-sofr-4683954, Sep. 30, 2023.

Derivative Processing Under the Dodd-Frank Act and European Market Infrastructure Reform (EMIR), Cleared Swap Handbook, BNY Mellon, 15 pages, Jun. 2013.

Fu, Yee-Tien: Derivative Security Markets: Currency and Interest Rate Swaps, 2009, MS & E247s International Investments, Standford. edu, pp. 1-82 (Year: 2009).

Gerald Gay et al., "The Pricing and Valuation of Swaps", E-Book, Financial Derivatives: Pricing and Risk Management, Chapter 28, 21 pages, Oct. 2009.

Gilbert, "Implications of Netting Arrangements for Bank Risk on Foreign Exchange Transactions", pp. 1-14, Mar. 2, 2003.

IRS Netting and Blending, Compression Overview, Clearing the Way Forward, Q4 2019.

ISDA, Interest Rate Swaps Compression: A Progress Report, ISDA Study, 9 pages, Feb. 2012.

James Chen, "Interest Rate Swap: Definition, Types, and Real-World Example", Investopedia, 5 pages, https://www.investopedia.com/terms/i/interestrateswap.asp, Sep. 29, 2023.

James Chen, "Understanding and Calculating an Overnight Index Swap (OIS)", Investopedia, 4 pages, https://www.investopedia.com/terms/o/overnightindexswap.asp, Dec. 29, 2020.

Labuszewski et al., "Speculative Strategies with Treasury Options", CME Group, 36 pages, Nov. 11, 2013.

Laurent et al., "An Overview of the Valuation of Collateralized Derivative Contracts", Rev Deriv Res, vol. 17, pp. 261-286, Aug. 28, 2014.

Letter to Melissa Jurgens, Office of the Secretariat, Commodity Futures Trading Commission, from Jason Silverstein, Executive Director and Associate General Counsel for CME, regarding CFTC Regulation 40.6(a) Certification. CME Rule 90008 (IRS Coupon Blending) CME/CBOT/NYMEX Submission No. 14-157, May 5, 2014, 5 pages.

Maximizing Interest Rate Portfolio Compression, Publication info: Derivatives Week Euromoney Institutional Investor PLC. (Mar. 26, 2012) (Year: 2012).

Orcun Kaya, "Reforming OTC Derivatives Markets, Observable Changes and Open Issues", Deutsche Bank, Current Issues, Global Financial Markets, 24 pages, Aug. 7, 2013.

Paul C. Harding, "The ISDA 2013 Standard Credit Support Annex", Derivatives Documentation Limited, 5 pages, Aug. 27, 2013.

Risk Management—Portfolio Compression for Outstanding Interest Rate Swap Trades, https://www.ccilindia.com/RiskManagement/Pages/Portfoliocompression.aspx, 2014, Developed by NSE-IT and maintained by CCIL-IT, 1 page, May 6, 2014.

Stu McClymont, Price Alignment Interest (PAI), The OTC Space, 4 pages, 2015.

Varma, Jayanth R., "Two curves and non deliverable interest rate swaps", Prof. Jayanth R. Varnna's Financial Markets Blog, Jul. 24, 2011(Year: 2011).

* cited by examiner

ELIMINATION OF LEGACY DATA OBJECTS VIA DATA COMPRESSION

BACKGROUND

Electronic financial transactions, and the positions created and held by participants therein, are created, processed, communicated and stored as electronic data records, each requiring an amount of computational resources to create, process, communicate and store, such as processing capacity, communications bandwidth, and storage capacity. As the volume of electronic transactions increases, so to do the necessary computational resources needed to handle those electronic transactions. Interest rate swap are type of electronic financial transaction and may be represented by data object which has an associated computational and storage burden. Some complex financial transactions, which may include multiple stages of maturity, may rely on complex data objects and multiple rounds of messaging. Thus, complex transactions such as interest rate swaps, may have a comparatively large computational and storage burden.

An interest rate is the price of money. A backward interest rate is price of money for a time period prior to the time that the rate is set, e.g. for the prior day also referred to as an overnight rate. A forward interest rate is the price, determined at the time the rate is set, of money for a future time period, e.g. the rate represents today's cost of future money. Short term interest rates are interest rates typically used for debt with future maturities less than one year from the current date and are typically administered by the central banks of nations, where, as will be explained, the different rates set by different national institutions may be used for different purposes. As opposed to short term interest rates, long term interest rates, for use with debt having maturities greater than 1 year, are typically set by market forces, i.e. through the bilateral negotiations of self-interested parties looking to transact based on the interest rate. An example of a national institutionally set short-term interest rate is the Federal Funds ("Fed Funds") rate.

The Federal funds rate is the rate at which U.S. banks lend money to each other overnight. The money in question is the reserves that sit in their bank accounts in the Federal Reserve system. If Bank A has excess reserves at the end of the day and Bank B has a reserve deficit at the end of the day (reserves are the money they have to keep on hand— electronically, at least—in case people ask for it; reserve requirements are set by the Federal Reserve), Bank A will loan the money to Bank B for a period of one day. The rate of interest Bank A will charge is the Federal funds rate.

The actual federal funds rate is set by the open market as banks loan each other money from day to day. The federal funds rate "target," on the other hand, is set by the Federal Open Market Committee ("FOMC"), which is headed by the Federal Reserve Chairman. Generally, when commentators refer to the federal funds rate, they're usually referring to the target rate set by the Fed, rather than to the actual federal funds rate. The FOMC meets every few months and decides whether to raise the federal funds rate target, lower it or keep it as is.

The target rate is used as a tool to help control the nation's money supply and promote employment. For example, if inflation begins to run above the Federal Reserve's target rate, the Fed may choose to raise the federal funds rate target. By doing so, the Fed is restricting the amount of money that's available to banks, making it more likely that they'll raise interest rates on commercial and consumer loans. That, in turn, should help control the prices of goods and services by dampening commercial activity. Meanwhile, if inflation runs below the target and/or other economic indicators militate towards doing so, the Fed may choose to lower the federal funds rate target in order to help bring borrowing costs down and encourage businesses and consumers to spend.

The Fed Funds rate is a backwards looking rate in that it is an aggregation of data from the prior day. That is, as opposed to being predetermined at the start of a time period, the Fed Funds rate is computed based on previously occurring events. Interest rate futures contracts which are based on the Fed funds rate are typically defined to settle at the end of a month based on the average effective Fed Funds rate occurring each day over that month of settlement. Accordingly, while one may not know the settlement price until the settlement date, as the settlement date draws nearer, the settlement price becomes more and more certain.

A now sunsetted example of a national institutionally set short-term interest rate is the London Interbank Offered Rate ("LIBOR"), which is an interest rate benchmark used as a reference rate for transactions. This reference rate reflects the general cost of large banks' borrowing that is not backed by collateral. U.S. dollar LIBOR plays a central role in the U.S. financial markets and economy. It is used to set interest rates on financial products such as mortgages and private student loans. Unlike the federal funds rate, which only applies to U.S. banks, the LIBOR is a London-based international interest rate benchmark used around the globe.

In essence, LIBOR was a short-term unsecured interest rate charged between banks for wholesale funding. However, LIBOR was also the primary benchmark for short-term interest rates around the world. LIBOR rates were calculated for five currencies and seven borrowing periods ranging from overnight to one year and are published each business day.

Publication of LIBOR rates ceased in June 2023 and unwinding LIBOR based financial instruments is an enormously complicated task. Due to the cessation, participants in various exchanges have moved away from LIBOR-based transactions.

The Secured Overnight Financing Rate (SOFR) is based on repo interest rates. A repo, or repurchase agreement, is a secured loan; one party sells a security to another party and agrees to repurchase it later at a set date and price. Because repos are a key source of short-term funding in the financial system, a rate based on these transactions is a good candidate for an alternative reference rate. The SOFR, like the Fed Funds rate, is a one day overnight rate and is the daily average rate for repo transactions secured against US treasuries. It measures the rate on average traded notional value.

The SOFR includes overnight, Treasury-backed repo transactions that take place in the Bank of New York Mellon's triparty repo system or are cleared through one of two Fixed Income Clearing Corporation platforms: (1) the Delivery-Versus-Payment Repo Service and (2) the General Collateral Finance (GCF) Repo Service.

SOFR looks at prior transactions, e.g. repo transactions or overnight funding agreements, to set rates. Thus, SOFR they be considered "backward" looking rates as discussed above. However, LIBOR, was based on projected transactions, and predetermined at the start of a time period, may be considered a "forward" looking rate.

As participants have gravitated to the new SOFR index these markets have grown. However, forward-looking LIBOR-indexed positions are incompatible with backward-looking SOFR-indexed transactions. Accordingly, active SOFR markets are unavailable as a platform for unwinding at least some legacy LIBOR-indexed positions.

As a result, participants are left holding legacy LIBOR-indexed positions until maturity, which can be for multiple days, months, or even years into the future. This creates an undesirable data burden on the systems requiring these positions to be stored as legacy data objects. Storage, processing, and maintenance communication computational burdens are all increased, where with normal transaction access, at least some legacy positions would be closed allowing deletion and final processing of the corresponding legacy data objects.

Moreover, the existence of such legacy data objects does not reduce the demand for new transactional activity. Thus, such legacy data objects create an especially pernicious "static" computational burden that cannot be mitigated via dynamic strategies for data reduction.

While costs associated with computers and memory storage devices have been falling as the underlying technologies are improved, available computing resources of organizations remain at a premium. For example, as businesses increasingly move towards electronic communications, electronic processing of business processes, and electronically monitoring of these communications and business processes, memory usage and computing processing power needs also correspondingly increase. In many cases, computing centers tasked with implementing and maintaining these electronic communications, business processes and data records are constrained by existing or aging hardware and software resources, and budgetary concerns regarding the purchase, upgrade, or repair of the hardware and software infrastructure components. This may be true for large or small business organizations.

In an illustrative example, a large organization may have many clients engaging in large numbers of electronic transactions, the details of which may be stored in memory or other electronic storage device, or communicated via electronic communications networks, etc. In many cases, these electronic transactions for multiple clients may occur continually and/or concurrently and be maintained over a substantial duration of time. As such computing resources, such as memory/storage, may be depleted and additional resources may need to be added to the system. Additionally, the data stored may be communicated between computing systems for processing. These communication requirements may result in slowed communications capability, as communication bandwidth on an organization's network may be a finite, limited resource.

As such, a need has been recognized for improved data management capabilities that are extensible to legacy data objects, while maintaining the desired parameters/business value of the underlying data for all data objects whether legacy or not.

DETAILED DESCRIPTION

Figure 1:
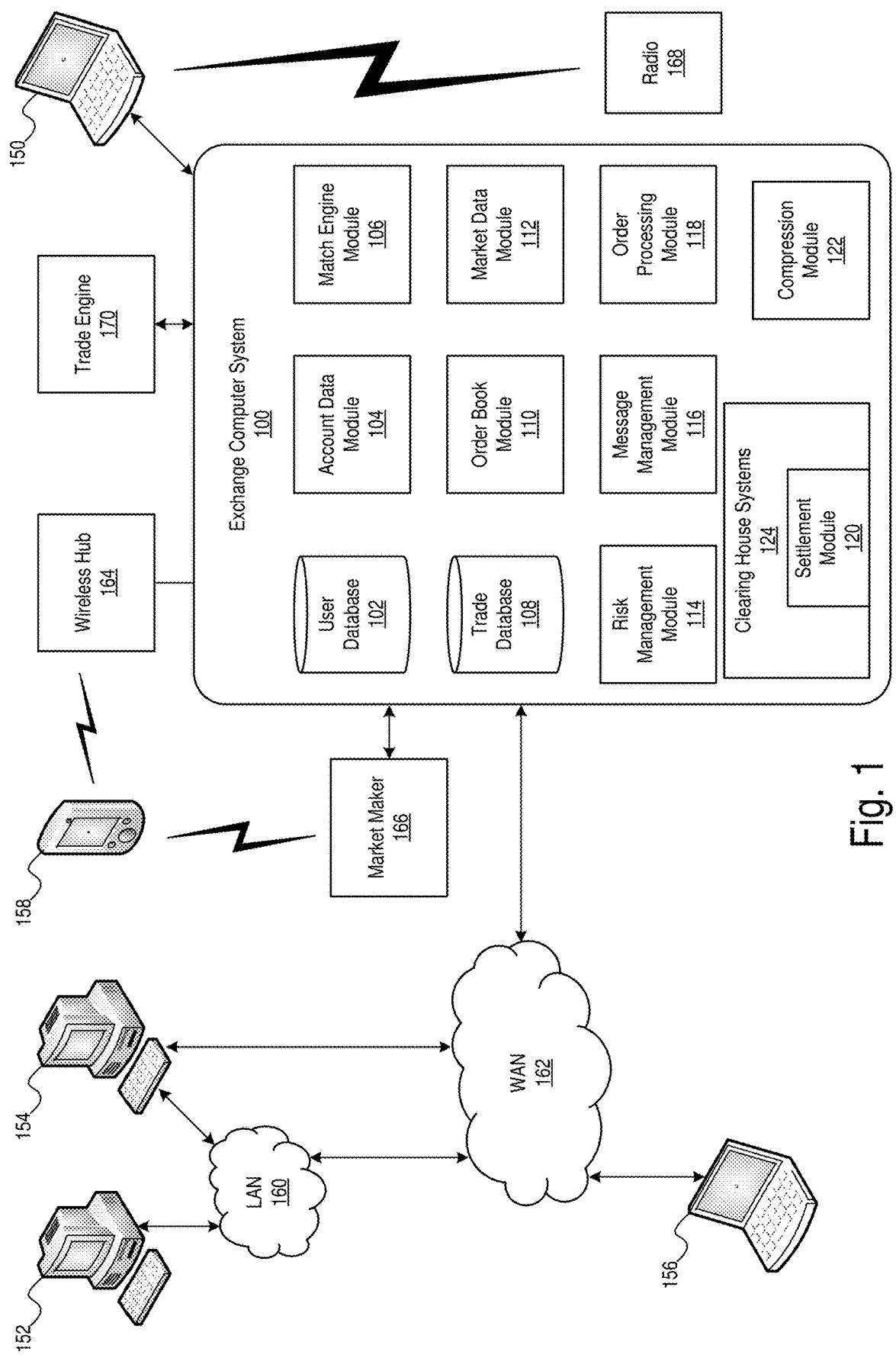
FIG. 1 depicts an electronic trading computer network system, according to various embodiments.

The disclosed embodiments relate to a computer implemented system and process which improves on the ability of an exchange computer system, or the clearing component thereof, to reduce and/or transform the data required to store data indicative of positions held by traders in interest rate swap (IRS) instruments. Specifically, the disclosed embodiments use a lossy data compression to implement this reduction and/or transformation of the data. Lossy data compression techniques allow, at least in some cases, a reduction in the data stored by algorithmically removing unnecessary or comparatively less valuable data, while preserving valuable data content. Herein, it is recognized that data compression algorithms may be applied in parallel to legacy and non-legacy data objects and use algorithmically preference non-legacy data such that legacy data is removed as a function of the lossy data compression. The disclosed embodiments may be deployed by the electronic trading system or as an adjunct service accessible thereby. Thus, the disclosed embodiments improve the operation of the electronic exchange systems by removing legacy data objects which present a pernicious "static" computational load. Further, the disclosed embodiments improve the operation of electronic exchange systems by reducing at least the legacy data required for storage and, in some cases, the total stored data. Data compression techniques, that are able to reduce data storage and computation loads without detrimental effects on data objects representing such complex transactions that result in a static computational load provide particularized technical value to electronic transaction systems.

Legacy data objects may include data objects for which an obsolescence event has occurred. An obsolescence event includes an event resulting in the legacy data object being supplanted by another class of "non-legacy" data objects that include at least one parameter and/or field missing and/or different from the legacy data object. In some cases, legacy data objects may have the same number of (or even more) fields/parameters than non-legacy data objects that supplants. Nevertheless, a legacy data object lacks, or provides a different, at least one parameter on which non-legacy data objects rely for operation. Thus, the legacy and non-legacy data objects are incompatible and non-interchangeable.

The missing or different parameter may include a value that may not necessarily be deterministically determinable based on the existing fields/parameters within the legacy data object. Accordingly, in at least some implementations, algorithmic conversion of legacy data objects into non-legacy data objects may not be available or may be impractical. Furthermore, the absence of the parameter field may disallow execution of operations that involve interaction (e.g., such as representation of a transaction) between legacy and non-legacy data objects.

For example, obsolescence events may include an upgrade to an electronic transaction system that adds, or modifies, a parameter to data objects allowing for a greater range of selectable user operations when manipulating data objects. As users migrate selections into the expanded portion of the operations space, the occupancy of the previous space shrinks, reducing activity within the previous space. As another example, older processes compatible with legacy data objects may be phased out in favor of (e.g., more computationally and/or network resource efficient) newer processes relying on the non-legacy data objects. Another example of an obsolescence event may include the cessation of an interest rate index, e.g., for data objects representing interest rate swaps. Another example of an obsolescence event may include addition of cryptographic tokens (or other cryptographic primitives) to allow for decentralized transaction—such that legacy data objects lack the technical features for trust portability for transaction representation in decentralized networks.

The disclosed embodiments are drawn to systems and methods that include specific computing components; each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in a data transaction processing system that processes data items or objects, such as an exchange computing system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing and report this information to data recipient computing systems via outbound messages published via one or more data feeds.

In one example, electronic trading involves traders transmitting electronic data transaction request messages, e.g., to buy or to sell a quantity of a financial instrument, to an exchange computing system that includes one or more hardware match engines that match, or attempt to match, the incoming data transaction request messages with one or more previously received request counter thereto that have not yet been satisfied.

In another example, traders may enter into a transaction away from the exchange computing system, e.g., a bilateral trade negotiated directly between those traders. Once a trade is agreed upon, those parties may submit the details of their transaction to the exchange computing to have the transaction cleared as will be described.

Once a trade event occurs, e.g., two of the transaction requests are matched either by the matching engine or bilaterally between the parties and submitted to the exchange computing system, the result is that the market participants involved in the match have positions which may be cleared by the exchange computing system, wherein clearing is generally a process by which the obligations of each trader are reconciled, recorded/stored and communicated to the necessary parties, etc.

Given that thousands or even millions of such transactions may occur on a daily basis, the volume of data that electronic trading systems must process and store can be substantial. Accordingly, mechanisms to reduce the amount of data may be necessary. The process of reducing this data may be referred to as "compression." Generally, compression in the computing context refers to reducing the amount of data necessary to represent some particular information, either faithfully without any loss of the information represented (lossless), or approximately with some acceptable loss of some of the information represented (lossy). Compression may be accomplished using encoding or replacement of data. In the context of the exchange computing system, compression of portfolio data generally aims to reduce the amount of data indicative of financial positions held by one or more traders while preserving the overall/aggregate economic and/or risk characteristics created by those positions, either within a given portfolio, i.e., unilaterally, or between multiple portfolios, i.e., multilaterally, as will be described. It is typically not required to preserve any data indicative of original uncompressed positions so long as the overall/aggregate economic and/or risk characteristics created by those positions is maintained.

One method of reducing or otherwise compressing the amount of data processed and stored in an electronic trading system, particular for data indicative of the positions held by the traders, is referred to as netting or offsetting. Netting/offsetting is a unilateral process whereby opposing positions held by the same entity, e.g., trader, which, effectively, partially or entirely cancel each other out, e.g., identical but for side (buy/sell) and possibly quantity, may be recognized and the data indicative thereof eliminated from the system. That is, the data size of the portfolio, the actual number of positions, or gross notional value are reduced but the net financial characteristics of that portfolio, e.g., the net notional value, risk profile, delta, etc., remain either at least substantially unchanged prior to and after the netting/offsetting is applied, or within trader-accepted/specified tolerances/constraints. It will be appreciated that the requirement that one or more characteristics remain unchanged before and after compression may itself be a constraint on the compression process. As used herein, netting and offsetting both refer to the removal of a negated position, or portion thereof, and not merely the discounting of a value thereof for certain calculations such as margin calculation.

For example, if a trader enters into identical but opposing positions to buy and sell the same quantity of the same item at the same price, those positions may cancel each other out and therefore may be eliminated, wherein the net notional value and/or risk profile of the portfolio remains the same. In some cases, one position may be offset by multiple other positions which, in combination, offsets or otherwise cancels out the position, e.g., a buy order for a given quantity is offset by the sum of the quantities of multiple opposing sell orders. In electronic trading systems which anonymize and novate transactions, i.e., where the trading system substitutes itself as the buyer to the seller and seller to the buyer in each transaction, such as a futures trading system, this unilateral process of netting/offsetting may be readily implemented as each trader's portfolio, and the data indicative thereof, may be evaluated in isolation from the data of other traders to remove opposing positions held by a single trader without affecting those other traders. Offsetting may be applied by analyzing a portfolio of positions to identify existing opposing positions which may be offset. Furthermore, each trader may analyze their own portfolio and specifically enter into offsetting positions in order to trigger the offsetting function to remove particular positions from their portfolio if they so choose. Alternatively, or in addition thereto, a system may be implemented by the electronic trading system, such as the clearing component/system, which may analyze a portfolio of positions, subject to constraints, and generate suitable positions, or transactions which would result in such offsetting positions, to offset and reduce the data size thereof while remaining within given constraints, i.e., the system would generate counter positions in the portfolio to offset existing trader-generated positions which would effectively reduce the number of positions, while one or more characteristics of the portfolio remain within specified constraints, e.g., remain unchanged. Such systems may automatically, such as based on the data size of a portfolio of positions exceeding a threshold amount, enact such transactions to reduce a portfolio size or may submit the generated transactions to the traders as recommendations to accept or not, in whole or in part. For example, such a system may recognize that two related trader-generated positions may be offset by a single counter-position resulting in a net reduction of one position, wherein the single counter position has the same effect on the portfolio's net notional value, risk profile or other characteristics.

Similar to exchange traded instruments, such as futures contracts, which involve purchase or sale of an obligation to occur at a later date, over-the-counter (OTC) products include financial instruments, i.e., derivatives, which involve obligations to occur at a later date but which are bought, sold, traded, exchanged, and/or swapped directly between counterparties instead of via an exchange, i.e., bilaterally. OTC products may further include periodic obligations, such as the periodic payment of interest, during the life of the position. OTC instruments include interest rate based instruments, such as forward swaps, interest rate swaps, described in more detail below, basis swaps, and currency based instruments, such as foreign exchange (FX) instruments.

Many OTC instruments/derivatives exist to fill a wide range of needs for the counterparties who buy and sell them, including limiting or mitigating exposure to risks and/or maximizing cash flow. After transacting an OTC product, counterparties may expend resources managing their position in that product for the duration of its life. Management of such data may be complicated based on the number of exchanges and/or the specific terms of the contract. As noted above, each such position may be represented by data stored in and processed by an electronic record keeping system, such as an electronic clearing system.

An interest rate swap (IRS) is an example of a type of OTC product where the parties agree to exchange streams of future interest payments, e.g., floating vs fixed interest rates, based on a specified principal or notional amount. Each stream, e.g., the floating rate stream and the fixed rate stream, may be referred to as a leg. Swaps are often used to hedge certain risks, for instance, interest rate risk. They can also be used for speculative purposes. An example of a swap includes a plain fixed-to-floating, or "vanilla," interest rate swap. The vanilla swap includes an exchange of interest rate streams, payments or cash flows where one interest rate stream/payments/flow is based on a floating rate and the other interest rate stream/payments/flow is based on a fixed rate. In a vanilla swap, one party makes periodic interest payments to the other based on a fixed interest rate. In return for the stream of payments based on the fixed rate, that party may receive periodic interest payments based on a variable rate from the other party. The payments are calculated over the notional amount defined in the contract. The variable rate may be linked to a periodically known or agreed upon rate for the term of the swap such as the London Interbank Offered Rate (LIBOR) or Secure Overnight Funding Rate (SOFR). This rate is called variable, because it is reset at the beginning of each interest calculation period to the then current reference rate, such as the LIBOR published rate.

The components of a typical IRS may be defined in a swap confirmation which is a document that is used to contractually outline the agreement between the two parties. The components defined in this agreement may include:

Notional—The fixed and floating coupons are paid out based on what is known as the notional principal or just notional. If one were hedging a loan with $1 million principal with a swap, then the swap would have a notional of $1 million as well. Generally the notional is never exchanged and is only used for calculating cash flow amounts;

Fixed Rate—This is the rate that will be used to calculate payments made by the fixed payer. This stream of payments is known as the fixed leg of the swap;

Coupon Frequency—This is how often coupons would be exchanged between the two parties, common frequencies are annual, semi-annual, quarterly and monthly though others are used such as based on future expiry dates or every 28 days. In a vanilla swap the floating and fixed coupons would have the same frequency but it is possible for the streams to have different frequencies;

Business Day Convention—This defines how coupon dates are adjusted for weekends and holidays. Typical conventions are Following Business Day and Modified Following;

Floating Index—This defines which index is used for setting the floating coupons. One common index is LIBOR. The term of the index will often match the frequency of the coupons. For example, 3 month LIBOR would be paid Quarterly while 6 month LIBOR would be paid Semi-Annually;

Daycount conventions—These are used for calculating the portions of the year when calculating coupon amounts;

Effective Date—This is the start date of a swap and when interest will start accruing on the first coupon; and Maturity Date—The date of the last coupon and when the obligations between the two parties end.

Interest rate swaps may further specify a spread value which is an adjustment or compensating value added to the payments required by either party to the other party. While historically uncommon, a spread may be negotiated by the parties, such as an additional adjustment to the floating rate on which the floating rate payments are based. For example, the parties may negotiate the floating rate to be a particular interest rate, e.g., LIBOR, plus 2% where the 2% is the spread. So when a party is to make a floating rate payment and the LIBOR rate is presently 3%, the party will pay 5% (3%+the 2% spread). Often the spread is specified in terms, or as a function, of the fixed rate defined by the IRS contract, e.g., fixed rate+0.25%.

The parties to an IRS swap generally utilize these transactions to limit, or manage, exposure to fluctuations in interest rates, or to obtain lower interest rates that would otherwise be unobtainable. Usually, at least one of the legs to a swap has a variable rate. The variable rate may be based on any agreed upon factors such as a reference rate, the total return of a swap, an economic statistic, etc. Other examples of swaps include total return swaps, and Equity Swaps. The expiration or maturity of the future streams of payments may occur well into the future. Each party may have a book of existing and new IRSs having a variety of maturity dates. The parties may expend substantial resources tracking and managing their book of/portfolio of positions in IRSs and other OTC products. In addition, for each IRS, the party maintains an element of risk that one of its counterparties will default on a payment. Currently, financial institutions, such as banks, trade interest rate payments and/or interest rate swaps over the counter. Streams of future payments must be valued to determine a current market price. The market value of a swap is the sum of the difference between the present value of the future fixed cash flows and the floating rate and the price of the swap is determined based on the fixed rate. Because the fixed rate of a particular swap is determined based on the available fixed rate at the time the price is struck, which frequently changes, the fixed rates associated with two different swaps will rarely be the same. As such, each swap that is struck causes a separate line item indicative of the position to be booked, i.e., data indicative thereof stored in relevant record keeping data storage systems, until an opposite swap with the same fixed rate is struck which may allow for offsetting/netting positions to be removed, as was described above.

Market participants, e.g., banks, traders or clearing firms, may be associated with large portfolios comprising hundreds, thousand, or even millions of positions that eventually will be cleared. A market participant portfolio, which includes open interest/positions, is associated with a computing cost as well as a financial cost. From a computing resources standpoint, the exchange/clearing computing system may store all of the post-trade positions associated with a trader, i.e., the trader's portfolio, in a data file, which may be processed and managed by the exchange computing system, and which may then be transmitted over a network to other institutions, such as regulators, or banks, or any other financial institution. Open positions may be represented as data elements in the data file.

In addition to the technical costs, many financial institutions that work with the exchange computing system require traders to post capital requirements that are based on the open interest associated with each trader. Thus, in addition to the computing costs of maintaining, processing and transmitting large data files with many data elements, open interest may also trigger capital requirements, which can burden traders and reduce the overall amount of trading that can be performed by the trader.

As was described above, in a typical futures trading environment, the standardization of futures contracts and the nature of the central counterparty based trading system, e.g., the process of novating trades, allows an Exchange, or market participant thereof, to net/offset together offsetting, e.g., opposing, positions in the same contract for the purpose of, for example, reducing the margin requirement to reflect the reduced risk of loss of such positions and/or to outright consolidate positions to reduce the size, e.g., data size, of the portfolio and/or reduce transaction fees therefore. As the Exchange, being a central counterparty to all transactions, ensures that each counter-party is not at risk of loss due to the default of the other party, such netting and consolidation by one market participant does not affect the positions and risk undertaken by another participant.

However, a cessation of publication activity for a particular rate index may lead to a rate index becoming inactive. For example, the LIBOR became an inactive rate index upon its cessation of publication of rates on Jun. 30, 2023. Once a rate index becomes inactive, trading volume for instruments reference that inactive index may fall and/or cease entirely. Accordingly, such netting/offsetting techniques, may be unavailable due to the reduced occurrence of new trades to serve as netting/offsetting counterparts. Similarly, data compression algorithms that remove data due to obviation/redundancy may be unavailable or have reduced efficacy when netting/offsetting does not occur. Thus, data size mitigation techniques, such as conventional data compression, may be unavailable for (or have reduced efficacy on) legacy data objects, e.g., data objects for which an obsolescence event has occurred. Legacy data objects may reference inactive rate indices, lack support for recently rolled-out user-selectable operations, and/or otherwise hold static data loads. Thus, legacy objects may include data defining transactions for which transactional volume is artificially reduced or eliminated.

The disclosed embodiments provide unconventional data compression techniques and architectures which preference the removal of legacy data objects (and/or other static data loads) over non-legacy data objects, while using dynamic data transactions from a non-legacy platform as basis for applying the data compression to the legacy data objects. Thus, the techniques and architectures disclosed herein improve the fundamental operation (e.g., data storage management, processing efficiency, and computer network performance) of computer-based electronic trading systems by reducing pernicious static data loads and improving data object management more generally.

To implement removal of data objects via data compress as discussed herein a technical arrangement may be selected. Technical arrangements for an embodiment may affect various technical embodiment characteristics. For example, a technical arrangement may affect how, when, and what memory locations are accessed, which operations are performed on the data stored in those memory locations, the timing for the operations, and which order such operations are performed. The illustrative example technical arrangements for the removal of data objects via data compress discussed herein differ in that one relies on compression via cross-linking for an existing non-legacy data object; the other relies on synthetic generation of a non-legacy data object pair to cancel and displace the legacy data object being removed. Technical arrangements may affect operation efficiency, calculation accuracy, computational load, data compression ratios, memory usage, and various other technical characteristics. Thus, technical arrangements further improve the operation of the underlying hardware. For example, the cross-linking data compression arrangement may effect a reduction in the total number of data objects and thus may reduce overall stored data. By contrast, the synthetic generation arrangement transforms the legacy data object, but does not effect a reduction in the total number of data objects. Accordingly, the synthetic generation arrangement may not necessarily be applied as data compression per se, but can be used to apply data compression algorithm to effect a data translation. Because of the technical advantages of non-static data over static data, the synthetic generation arrangement can improve computational performance even in the absence of reduction of the total number of data objects. In effect, this is similar the application of cryptographic compression routine to encrypt a file, such a JPEG picture, for security purposes even when (as is the often the case for JPEG picture files) the compression algorithm affords little or no data size reduction.

Further, each specific technical arrangement details more than the already concrete data compression based legacy data object removal, for example, by specifying how and when data compression is applied to effect removal of legacy data objects. Selection among these example technical arrangements and others, is exclusively based on the technical considerations (e.g., storage availability, total static data load, processing power, system latency, system security architecture, and network data access timing, etc.) that are in addition to the separate technical question as to whether data compression should be implemented for legacy data object removal. Data compression for legacy data object removal may be implemented in a system independently of any particular technical arrangement, e.g., by using another different technical arrangement that lacks the features of that particular technical arrangement.

Cross-Linking Arrangement—As an example of a technical arrangement for implementation of legacy data object removal via data compression, cross-linking, in which one or more legacy data objects are cross-linked to a non-legacy participant data object with equal net flow magnitude and opposite polarity may be implemented. A locking action across the respective data structures may be used to effect the link between one or more legacy data objects and the participant data object. The one or more legacy data objects and the participant data object are then removed from data structure storage as a result of the cross-linking to effect data compression. The cross-linking also effectively supplants (e.g., substitutes) the transactional linking of the participant data object and a counter-party data object (e.g., associated with a transactional counter party) arising out the transaction that generated the participant data object. The cross-linking may operate as a temporary bridge between the legacy and non-legacy data object across their respective data structures in which the data objects are stored. The use of locking during cross-linking allows for bridging between separate data structures, e.g., legacy data structures and non-legacy data structures, which may list the respective legacy and non-legacy data objects. For example, the locking between the data objects may not necessarily require listing of incompatible data object on either the legacy or non-legacy data structure. In electronic trading systems, the data structures may include an order book of swaps, e.g., which may be specific to the type of IRS swaps stored therein.

Synthetic Generation Arrangement—As an example of a technical arrangement for implementation of legacy data object removal via data compression, synthetic generation, in which one or more legacy data objects are removed via linking with a synthetic non-legacy data object may be implemented. The synthetic non-legacy data object may be generated as one half of an opposing polarity pair by a single participant, e.g., synthetic non-legacy data object and a synthetic non-legacy counter object. The synthetic non-legacy counter object is paired to the one or more legacy data objects and are removed via data compression. Accordingly, the synthetic non-legacy data object remains. The synthetic non-legacy data object then retains flow magnitude and polarity identical to that of the net flow magnitude and polarity of the one or more legacy data objects. Because the synthetic non-legacy data object is synthetically generated and may include annotation fields identifying it as synthetic, the non-legacy data object may be listed on legacy data structures, relying on the annotation for compatibility. Accordingly, the synthetic generation arrangement may operate without a cross-linking between data objects on the separate data structures. Similarly, the synthetic non-legacy counter object may be added to a non-legacy data structure in connection with completion of the data compression but not necessarily referencing any transaction in which it was created. Rather, the annotation field may identify the synthetic non-legacy counter object as synthetic.

However, where the synthetic generation arrangement is applied in cases where only single legacy data object is involved in the compression, no reduction in total data objects may necessarily occur. Rather, only a reduction in the number of legacy data objects occurs. Conversely, the cross-linking arrangement reduces the total number of data objects regardless of the number legacy data objects involved because the cross-linking arrangement does not synthetically create non-legacy data objects and removes a non-legacy data object along with any removed legacy data objects. Thus, the cross-linking arrangement and synthetic generation arrangement differ with regard to technical effect in addition to differing with regard to technical operation.

For implementation of cross-linking arrangements and/or other technical arrangements that rely on existing non-legacy data objects to effect data compression, Various solutions for identifying positions within (unilateral) individual and across (multilateral) multiple portfolios of a multilateral portfolio for multilateral compression have been developed. See, e.g., U.S. Pat. Nos. 8,494,953; 10,319,032; 10,475,123; 10,609,172; 10,650,457; 10,789,588; 10,884,988; 10,896,467; 10,992,766; and 11,004,148, as well as U.S. Patent Application Publication Nos. 2013/0282554 A1; 2020/0356990 A1; 2021/0097620 A1; 2021/0211516 A1; and 2021/0217086 A1, all of which are incorporated by reference herein. Such solutions may involve linear optimization systems/techniques which are used by electronic trading systems to analyze a collection of portfolios belonging to multiple traders, e.g., a multilateral portfolio, in order to identify positions which may be netted and/or calculate new positions which may then create netting opportunities. In many such cases, these systems, once suitable positions are identified, may generate new positions, or transactions which, when processed, create those new positions, for a subset of the traders to replace multiple positions held thereby, where the new positions are fewer than those that are to be replaced, thereby reducing the data size of the data indicative of the portfolios, but are characterized by the same economic or other parameters, e.g., they represent/create/maintain the same cash flow and/or risk profile as the positions which are to be removed.

In the past, the over-the-counter (OTC) swap market was largely a bespoke market, where a customer desiring to enter into a swap would contact, such as by telephone, one or more dealers to determine which dealer would offer the best price to enter into the deal. In such cases, the swap may be entered on a common platform, but the trade execution was completed by phone. Because swaps may not be fully transparent, governmental regulations have required that swaps be executed via a Swap Execution Facility (SEF). A SEF is a regulated platform for swap trading that provides pre-trade information, such as bids, offers, and the like, and/or an execution mechanism to facilitate execution of swap transactions among eligible participants. Over time more and more types of swaps may be executed via a SEF, such as interest rate swaps. Because the SEF may operate using a more automated swap market mechanism, the likelihood that a customer may enter into different swaps, where each share a same interest rate will become increasingly rare. A SEF may execute many swaps with multiple coupons at a centralized location. In some cases, different swaps may share the same, or similar, economics to another swap. However, the coupons are likely to differ due to the swaps executing at different times. As such a client may quickly build a book (e.g., swap portfolio) with many swap line items, which, in turn, would require the client to incur a large capital obligation corresponding to the gross notional and/or the total clearing line items of the book of swaps.

Aspects of at least some embodiments can be implemented with computer systems and computer networks that allow users to communicate trading information. An exemplary trading network environment for implementing trading systems and methods according to at least some embodiments is shown in FIG. 1. The implemented trading systems and methods can include systems and methods, such as are described herein, that facilitate trading and other activities associated with financial products based on currency pairs.

Computer system 100 can be operated by a financial product exchange and configured to perform operations of the exchange for, e.g., trading and otherwise processing various financial products. Financial products of the exchange may include, without limitation, futures contracts, options on futures contracts ("futures contract options"), and other types of derivative contracts. Financial products traded or otherwise processed by the exchange may also include over-the-counter (OTC) products such as OTC forwards, OTC options, etc.

Computer system 100 receives orders for financial products, matches orders to execute trades, transmits market data related to orders and trades to users, and performs other operations associated with a financial product exchange. Exchange computer system 100 may be implemented with one or more mainframe, desktop or other computers. In one embodiment, a computer device uses one or more 64-bit processors. A user database 102 includes information identifying traders and other users of exchange computer system 100. Data may include user names and passwords. An account data module 104 may process account information that may be used during trades. A match engine module 106 is included to match prices and other parameters of bid and offer orders. Match engine module 106 may be implemented with software that executes one or more algorithms for matching bids and offers.

A trade database 108 may be included to store information identifying trades and descriptions of trades. In particular, a trade database may store information identifying the time that a trade took place and the contract price. An order book module 110 may be included to store prices and other data for bid and offer orders, and/or to compute (or otherwise determine) current bid and offer prices. A market data module 112 may be included to collect market data, e.g., data regarding current bids and offers for futures contracts, futures contract options and other derivative products. Module 112 may also prepare the collected market data for transmission to users. A risk management module 134 may be included to compute and determine a user's risk utilization in relation to the user's defined risk thresholds. An order processor module 136 may be included to decompose delta based and bulk order types for further processing by order book module 110 and match engine module 106.

A clearinghouse module 124 may be included as part of exchange computer system 100 and configured to carry out clearinghouse operations. Module 124 may receive data from and/or transmit data to trade database 108 and/or other modules of computer system 100 regarding trades of futures contracts, futures contracts options, OTC options and contracts, and other financial products. Clearinghouse module 124 may facilitate the financial product exchange acting as one of the parties to every traded contract or other product. For example, computer system 100 may match an offer by party A to sell a financial product with a bid by party B to purchase a like financial product. Module 124 may then create a financial product between party A and the exchange and an offsetting second financial product between the exchange and party B. As another example, module 124 may maintain margin data with regard to clearing members and/or trading customers. As part of such margin-related operations, module 140 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 140 may determine values for performance bonds associated with trading in products based on various types of currency pairs.

Each of modules 102 through 124 could be separate software components executing within a single computer, separate hardware components (e.g., dedicated hardware devices) in a single computer, separate computers in a networked computer system, or any combination thereof (e.g., different computers in a networked system may execute software modules corresponding more than one of modules 102-124).

Computer devices 150-158 is shown directly connected to exchange computer system 100. Exchange computer system 100 and computer device 150-158 may be connected via a T1 line, a common local area network (LAN) or other mechanism for connecting computer devices. Computer device 150 is shown connected to a radio 168. The user of radio 168 may be a trader or exchange employee. The radio user may transmit orders or other information to a user of computer device 150. The user of computer device 150 may then transmit the trade or other information to exchange computer system 100.

Computer devices 152 and 154 are coupled to a LAN 160. LAN 160 may implement one or more of the well-known LAN topologies and may use a variety of different protocols, such as Ethernet. Computers 152 and 154 may communicate with each other and other computers and devices connected to LAN 160. Computers and other devices may be connected to LAN 160 via twisted pair wires, coaxial cable, fiber optics, radio links or other media.

A wireless personal digital assistant device (PDA) 158 may communicate with LAN 160 or the Internet 162 via radio waves. PDA 158 may also communicate with exchange computer system 100 via a conventional wireless hub 164. As used herein, a PDA includes mobile telephones and other wireless devices that communicate with a network via radio waves.

FIG. 1 also shows LAN 160 connected to the Internet 162. LAN 160 may include a router to connect LAN 160 to the Internet 162. Computer device 156 is shown connected directly to the Internet 162. The connection may be via a modem, DSL line, satellite dish or any other device for connecting a computer device to the Internet. Computers 152, 154 and 156 may communicate with each other via the Internet 162 and/or LAN 160.

One or more market makers 166 may maintain a market by providing constant bid and offer prices for a derivative or security to exchange computer system 100. Exchange computer system 100 may also include trade engine 170. Trade engine 170 may, e.g., receive incoming communications from various channel partners and route those communications to one or more other modules of exchange computer system 100.

One skilled in the art will appreciate that numerous additional computers and systems may be coupled to exchange computer system 100. Such computers and systems may include, without limitation, additional clearing systems (e.g., computer systems of clearing member firms), regulatory systems and fee systems.

The operations of computer devices and systems shown in FIG. 1 may be controlled by computer-executable instructions stored on non-transitory computer-readable media. For example, computer devices 150-158 may include computer-executable instructions for receiving market data from exchange computer system 100 and displaying that information to a user. As another example, clearinghouse module 124 and/or other modules of exchange computer system 100 may include computer-executable instructions for performing operations associated with determining performance bond contributions associated with holdings in products that are based on various types of currency pairs.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

In some cases, the clearinghouse module 124 may be configured to monitor and/or otherwise manage a capital obligation associated with a plurality of swaps, such as a swap portfolio. In at least some embodiments, the exchange computer system 100 (or "system 100") receives, stores, generates and/or otherwise and processes data. In accordance with various aspects of the disclosed embodiments, a clearinghouse (e.g., the clearinghouse module 124) may act as a guarantor of the agreement for the derivative. As discussed above, a derivative (e.g., an over the counter swap) may be cleared and guaranteed by the clearinghouse. This may promise more interesting capital efficiencies to allow institutions to reduce a capital charge associated with a plurality of swaps, such as by reducing a gross notional and/or reducing line items associated with the plurality of swaps.

In one embodiment, the disclosed compression processes may be applied automatically to all trader's portfolios or may be applied only to select portfolios, or only select portions (positions/line items), thereof, at the option of the associated trader, e.g. via configuration parameters set by the trader. Whether applied to all or only select portfolios, or portions thereof, the disclosed systems may be automatically applied periodically, such as at the close of the trading day, or on as needed basis, e.g., where the data size of the portfolio, or portion thereof, to be compressed exceed a particular size threshold. In one embodiment, the disclosed compression process may be further manually triggered at the discretion of a trader or an entity operating the clearing house or the exchange computing system.

Figure 3:
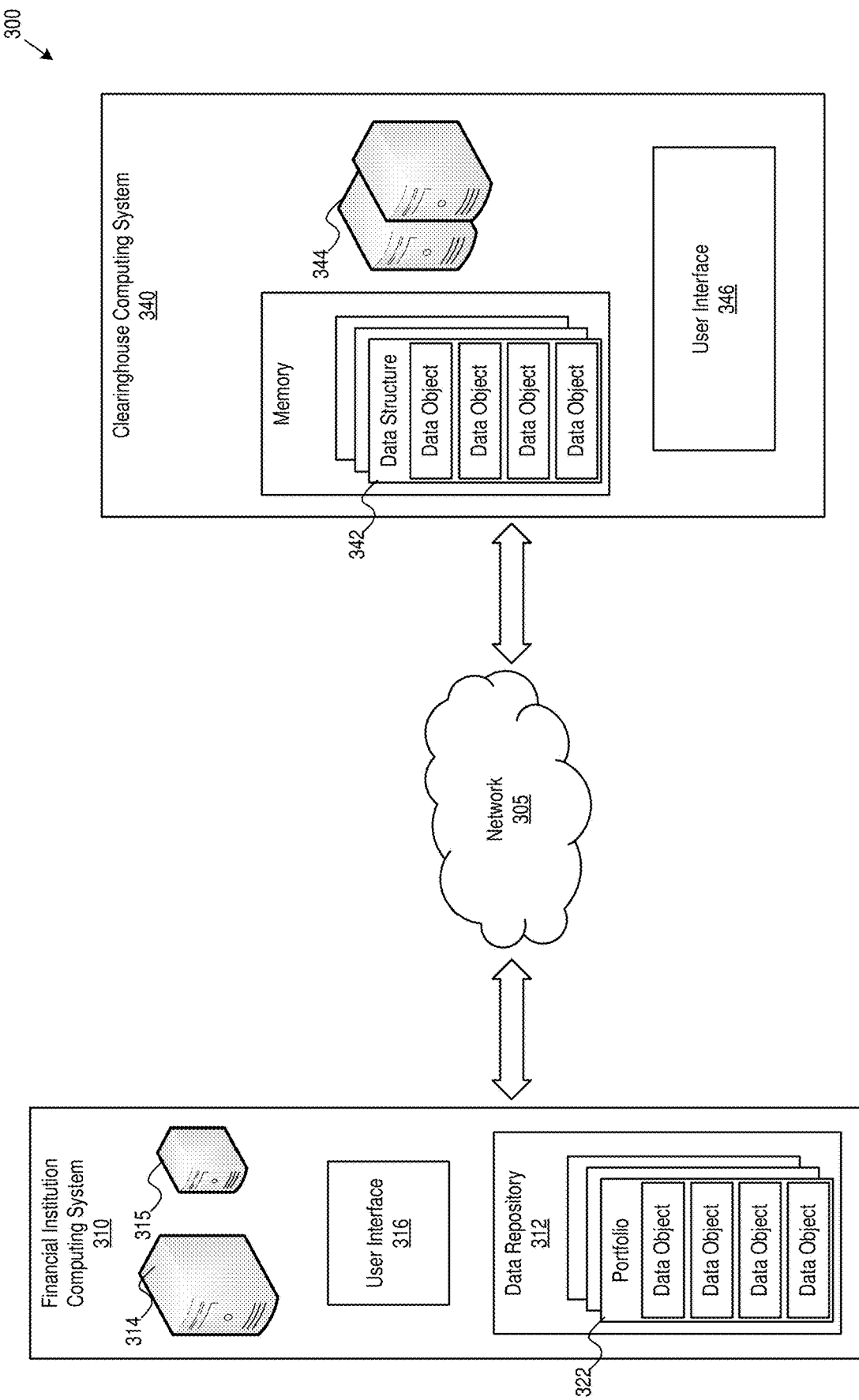
FIG. 3 depicts a block diagram of a portion of an illustrative system for data compression of data objects associated with a plurality of swaps according to various embodiments.

FIG. 3 shows an illustrative system 300 for data compression of data objects in accordance with one embodiment. In some cases, the illustrative system 300 may include a financial institution computing system 310 communicatively coupled to a clearinghouse computer system 340 via a network 305 (e.g., a wide area network (WAN), the LAN 124, the Internet 126, etc.). The financial institution computing system 310 may include one or more data repositories 312, one or more computing devices 314, and, in some cases, at least one user interface 316. In some cases, the data repositories 312 may store data objects associated with one or more swap portfolios 322, where the swap portfolios may include data objects defining the legs of two or more different swaps (e.g., swap 1, swap 2, swap n, etc.). For example, the data objects may include a fixed rate value, a floating rate value, a notional value, and/or a cash value for each of the plurality of different swaps of the swap portfolios 322. In some cases, the swap portfolios 322 may be associated with the financial institution, and/or one or more different customers of the financial institution. For example, a financial entity and/or a customer of the financial entity may desire to enter into one or more different swaps to hedge financial risk due to a plurality of fixed rate holdings and/or a plurality of floating rate holdings. In some cases, a computing device 315 and/or the user interface 316 may be used to facilitate user access to the one or more swap portfolios 322. For example, a user may log into the financial institution computing system 310 via one or more user interface screens accessible via the user interface 316. In some cases, the user interface 316 is at a geographical location local to the financial institution computer system 310 and/or at a geographical location of the user.

In some cases, the clearinghouse computer system 340 may include one or more data structures 342 (e.g., multiple separate data structures for swaps using different rate indices), a computer device 344 and/or a user interface 346. The clearinghouse computer system 340 may be communicatively coupled to at least one financial institution computer system, such as the financial institution computing system 310 via the network 305. In some cases, the clearinghouse computer system 340 may be configured to obtain information about one or more of the swap portfolios 322, process the information to link data objects associated with the different swaps of the swap portfolios 322 within the data structure 342 and communicate information about the linked data objects to the financial institution computing system 310 to reduce one or more line items associated with the swap portfolios 322 to reduce the number of legacy data objects stored in the data structures of the clearinghouse computer system and the data repositories of the financial institution computer system.

Systems and methods are described for reducing memory storage and communication bandwidth requirements by compressing data based on the underlying stored information. A memory management computing device may be programmed to monitor a size of a plurality of data structures stored in a data repository, i.e., the data structures which store data indicative of the IRS positions held in each trader's portfolio. The computing device may compare the size of each of a plurality of data structures (e.g., or specifically for legacy data structures) to a predetermined threshold. When a size of an uncompressed data structure meets the threshold, the memory management computing device may implement the compression processes disclosed herein, e.g., calculate a value of a first compression parameter based on a value of a first parameter and a value of a second parameter of each data element of the uncompressed data structure, calculate a value of a second compression parameter based the value of the first parameter of each data element of the uncompressed data structure, and generate a compressed data structure based on the value of the first compression parameter and the second compression parameter. The memory management computing device may replace, in the data repository, the uncompressed data structure with the compressed data structure.

In some implementations, the data size threshold may be determined based on one or more reference data sizes. For example, an average data size (mean size, median size, or other statistically representative size) for a group of data elements associated with a single swap transaction may be calculated. The average data size may be specific to the type of swap transaction being collected in the data repository and/or specific to the type of swap being compared to the threshold. For example, a threshold for a swap of a first type may be based on an average data size that is representative of swaps of the first type, but that same average data size may not necessarily be representative of swaps of other types. In some cases, the threshold may be based on a maximum data size for a single swap. The maximum data size may be based on empirical data, e.g., by recording the largest data size encountered in a population of swaps and/or based on theoretical data, e.g., by assuming maximum occupancy of any data fields within the data elements characterizing a swap. In an example, the reference data size may be used to trigger compression when a specific number of swaps have accumulated in the data repository.

In an example, a reference data size may include a data size for a specific data field. For example, in some cases, individual swaps may be characterized by a single fixed rate, a single spread, or other single value of a given type. Accordingly, the reference data size may be based on the data size of a specific value type within the data elements. The threshold comparison may be specific to the data storing that value type. In some cases, a reference data size that is specific to a particular value type may allow for reduced variance in data size from swap to swap. Thus, usage of a reference data size specific to a data field type may be used to more accurately measure the number of swaps that have accumulated in the data repository.

In some cases, the threshold may be based on other factors such as the fullness of the data repository itself, the maximum data reserved in the data repository for swaps of the type being compared to threshold, and/or other storage capacity constraints.

In some cases, the remote computing system 340 may monitor a size of each of the plurality of data structures 342, where the size of the data structure may correspond to the number of data elements of each data structure (e.g., the number of data elements of data structure 342). In some cases, the remote computing system may compare the size of each data structure 342 to a pre-defined threshold. In some cases, the size of each data structure may be compared to the same threshold for each data structure may be assigned a different threshold based on characteristics of a user, business organization, or data stored in the data structure. For example, the threshold may be 100 data elements, 1,000 data elements, 10,000 data elements or the like. In many cases, the remote computing system may be used to manage memory requirements for a large number of data structures stored on one or more different computing devices.

Figure 4:
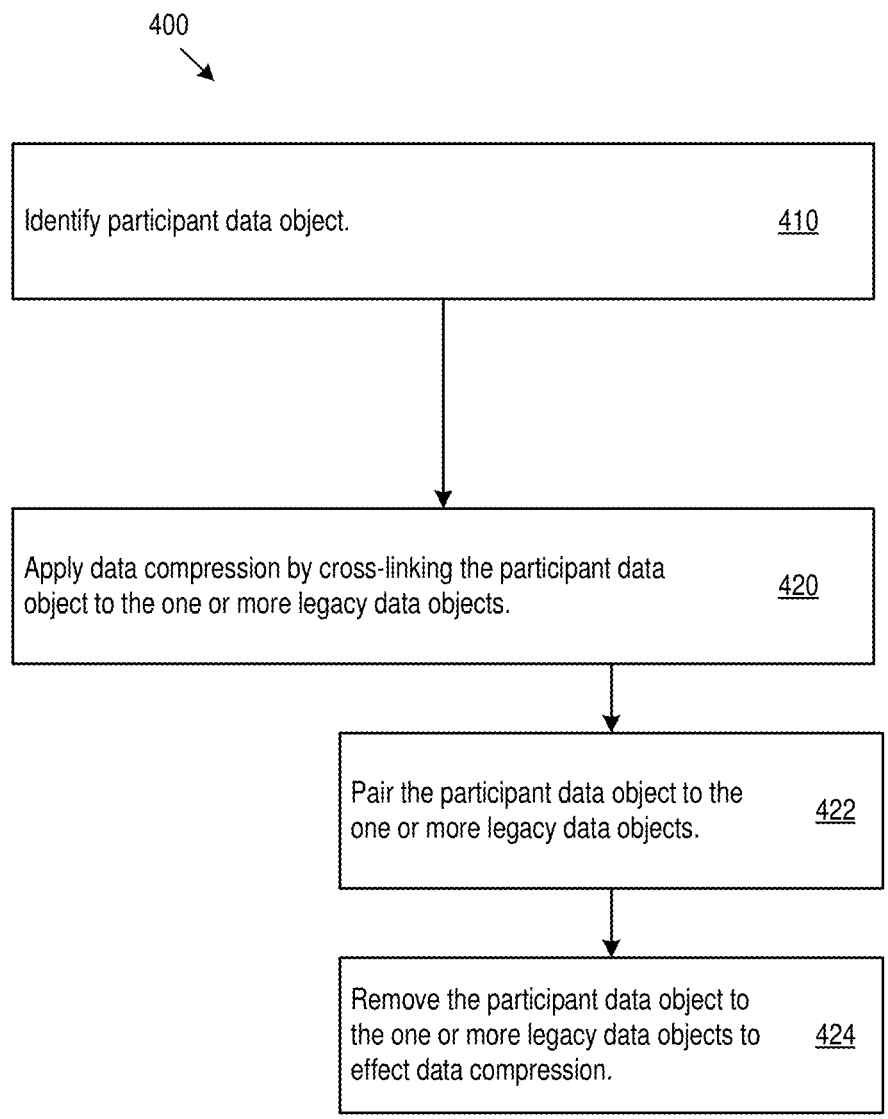
FIG. 4 depicts a flow chart of example data compression logic for data compression of data objects associated with a plurality of swaps according to various embodiments.

FIG. 4 shows example data compression logic (DCL) 400 for operation of the example system 300. The DCL 400 may be implemented via the system 300, for example, using a computer system such as the example computer 200 as an execution platform. Various modules of the computer system 100 may implement various functions of the logic 400. Thus, various portions of the example system 300, the example computer 200, and/or the computer system 100 may serve as means for execution of the functions of the FIG. 4.

At 410, the DCL 400 may identify a participant data object, such as a data object representing an IRS within the data structure 342 (and/or the data repository 312) of the system of FIG. 300. The participant data object may define a non-legacy flow for a participant. For example, the participant data object may define a cash flow for one or more legs of an IRS transacted by the participant. The participant data object is non-legacy data object so the participant data object may reference only active rate indices.

The DCL 400 may identify the participant data object as a candidate for data compression by matching the participant data object, e.g., based on the non-legacy flow or other characteristics that may be paired to other data objects and/or a net effect of multiple data objects. In some cases, the identification may be based on the participant data object causing a net effect in conjunction with other data objects for which the resultant net effect can be paired with another data object and/or net effect of multiple other data objects.

In some cases, the multiple other data objects may be associated with data objects held by multiple participants. Thus, the relevant net effect may be the net magnitude/timing/polarity of the resultant non-legacy flow for the participant (e.g., the participant flow). The other effects may be netted/offset in a multi-participant chain via a netting algorithm by the DCL 400, but the DCL 400 may implement legacy data object management by taking the individual participant net flows and applying compression to legacy data objects at the individual participant-level (e.g., without using multi-participant netting effect on the legacy data objects). Nevertheless, various embodiments may net a multi-participant chain of non-legacy data objects against a multi-participant chain of legacy data objects using various netting algorithms.

In some cases, the DCL 400 may determine that the non-legacy flow of the participant data object can be paired to (e.g. because the non-legacy flow is equal in magnitude to and opposite in polarity to) a net flow associated with one or more legacy data objects. The DCL 400 may prioritize data compression involving legacy data objects due to the technical performance advantages of removing/reducing legacy data objects. Accordingly, when the non-legacy flow of the participant data object is matched to the net flow associated with one or more legacy data objects, the prioritization applied may preference matching with the legacy data objection. Thus, in some embodiments, the participant flow may include a net non-legacy flow defined by multiple non-legacy data objects including the participant data object. Accordingly, multiple non-legacy data objects may be paired and compressed with the one or more legacy data objects. Nevertheless, the net non-legacy flow may be constrained to match the net legacy flow in both timing and magnitude.

In various embodiments, the net legacy flow of the one or more legacy data objects may be determined by combining the legacy flows of the individual legacy data objects. Flows of the same polarity may be added together. The larger magnitude sum of the opposing polarity sums may be applied as the polarity of the net legacy flow. The opposing polarity sums may be subtracted from one another to obtain the magnitude of the net legacy flow. Other flow combination algorithms, such as various netting algorithms, may be used.

The timing of the flows may be determined the by the future date (or other timing value) on which the flow activates. For example, for a cashflow in an IRS swap the timing may be defined by coupon settlement date(s). In some cases for certain short-dated data objects, only a single flow date may occur before the data object terminates.

In various embodiments, the matching of the flows may occur at varying numerical precisions. In an example embodiment, a precision of five decimal places may be specified in rate value, flow value, and/or other values to ensure computation accuracy and robustness. In some cases, a minimum precision may be selected for a particular value type, e.g. such a flow magnitude. The selected minimum precision for the flow value may be used to determine precision for other values so as to ensure at least the proper resultant minimum precision for the computed flow value, e.g., because multiplicative operations and/or other scaling operations may result in a change in resultant precision after implementation of the operation.

The flows, having equal magnitude, may also be required to have opposite polarity to be paired for data compression. The polarity may include a directionality of a flow. For example, the direction may be flow to or from a participant (e.g., corresponding to a loss or gain in the case of cash-flows).

In various embodiments, the participant flow may be created by defining an execution amount, e.g., via an upfront fee, for the participant data object. Accordingly, the transaction that creates the participant data object may be structured to create a specific characteristics of the participants data object, such as an upfront fee matching the polarity and magnitude of the net legacy flow and timing for settlement of the execution amount that corresponds to the timing of the net legacy flow. Further, in some embodiments, the participant data object may be generated with a nominal notional value, e.g., to ensure compatibility with various cross-linking procedures. Use of an execution amount and a nominal (or zero-valued) notional value may avoid multi-step flow magnitude computations and increase the processing efficiency of the data conversion process, e.g., be reducing computational load associated with the participant data objects.

After determining that the participant flow defined by the participant data object is matched to the net legacy flow of the one or more data objects. The DCL 400 may, at 420, apply data compression.

The data compression may be applied in multiple stages. Consistent with a cross-linking technical arrangement, the DCL 400 may lock the data objects to one another. The cross-link may serve as a bridge between the non-legacy and legacy data structures on which the participant data object and one or more legacy data objects are stored, respectively. At 422, the cross-linking may executed by pairing the participant data object and one or more legacy data objects on the respective data structures. At 426, the paired objects (across the respective data structures) may be removed to effect the compression. For example, the pair may be identified as "offsetting" such that the participant data object on the non-legacy data structure and the one or more legacy data objects on the legacy data structure offset one another. In some cases, additional criteria may apply. For example, the participant data object may be required to define the participant flow via an execution amount (e.g., such as an upfront fee) and/or have a nominal notional value, such a $1, or other nominal notional value. Thus, in accord with various offsetting-based compression algorithms, the participant data object and the one or more legacy data objects may be removed from their respective data structures. Accordingly, the data compression operations reduce the static data load by removing the one or more legacy data objects and the total data load by removing the combination of non-legacy and legacy data objects.

In various embodiments using the synthetic generation arrangement, the operations by the DCL 400 to identify and match the existing non-legacy data object(s) are obviated. Instead, the DCL 400 may generate a pair of opposite polarity non-legacy data objects with flows matched in magnitude and timing to the net legacy flow (a synthetic data object and synthetic counter object). The non-legacy data object (e.g., the synthetic data object) with the same polarity as the net legacy flow may be added to the non-legacy data structure. This synthetic data object may include a specific annotation field to indicate the data object is synthetic. Otherwise, the synthetic data object may appear to arise without an initial transaction in which it would have been created. The synthetic counter object may be added to the legacy data structure. Similarly, the synthetic counter object may include the annotation field because the synthetic counter object is of a mismatched type to the legacy data structure. Thus, without the annotation field, the synthetic counter object, which is non-legacy, would be incompatible with the legacy data structure. After addition of the synthetic counter object to the legacy data structure, the synthetic counter object and the one or more legacy data objects are removed to effect the compression. The synthetic data object may remain on the non-legacy data structure.

As discussed above, the synthetic generation arrangement reduces the static data load by effecting the removal of the one or more legacy data objects. However, the synthetic generation arrangement may not necessarily result in a reduction in the number of total data objects where only a single legacy data object is removed in the process because the non-legacy synthetic data object is created via the process and remains after completion.

In various embodiments, the DCL 400 may be applied to particular classes of legacy data objects. For example, legacy data objects with a start date, e.g., a date in which rates from the rate indices begin to be tracked for the purposes of flow computation, in the past. But for which the maturity date remains in the future. In some cases, the start date for the legacy data object may be before the cessation date on which the inactive rate index became inactive.

In some embodiments, the legacy data objects may include short-dated data objects for which a final maturity date occurs within 3 months, 6 months, or 12 months. In some cases, such short-dated data objects may have only a single flow execution date (e.g., such as coupon settlement date) before maturity of the short-dated data objects. In some cases, such short-dated data objects may result from compression/conversion of a forward long-dated portion of an existing legacy data object, for which fixing date at the start of the forward long-dated portion has not yet occurred. Thus, the forward long-dated portion may be separated from the short-dated portion and compressed/converted.

Due to the recent cessation of the LIBOR and prior SOFR conversions of forward portions of LIBOR referencing IRS (e.g., conversion of not-yet-seasoned portions of the IRS), short-dated legacy data objects with starting dates in the past (and in particular prior to cession of the LIBOR) have been created. The data compression techniques and architectures discussed herein may be used to reduce and remove these short-dated legacy data objects.

Exchange Computing System/Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principals involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software-based components. Further, to clarify the use in the pending claims and to hereby provide notice to the public, the phrases "at least one of <A>, <B>, ... and <N>" or "at least one of <A>, <B>, ... <N>, or combinations thereof" are defined by the Applicant in the broadest sense, superseding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

Figure 2:
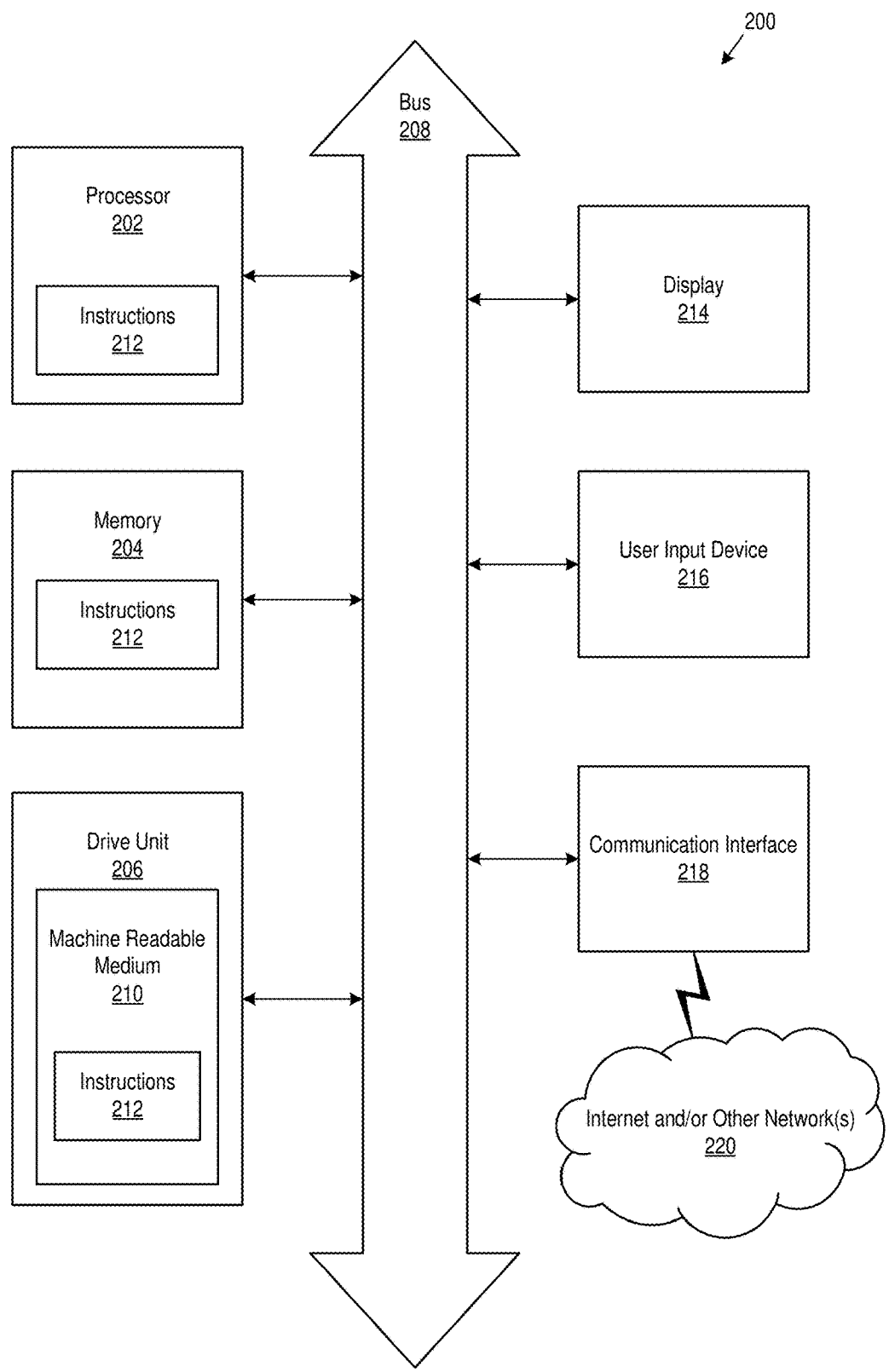
FIG. 2 depicts an example computer system, according to various embodiments.

The exchange computer system 100 may be implemented with one or more mainframe, desktop or other computers, such as the example computer 200 described herein with respect to FIG. 2.

A user database 102 may be provided which includes information identifying traders and other users of exchange computer system 100, such as account numbers or identifiers, usernames and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included as part of the clearing systems 124 which provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100 and comprised by the clearing systems 124. For example, the settlement module 120 and the risk management module 114 may be integrated to any desired extent. In some cases, one or more margining procedures or other aspects of the margining mechanism(s) may be implemented by the clearing systems 124, such as the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120 or clearing systems 124, compression module 122 or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based compute device, or other wireless device, may communicate with the LAN 160 and/or the Internet 162 via radio waves, such as via WiFi, Bluetooth and/or a cellular telephone-based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD ThreadRipper processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

As described, the disclosed embodiments relate to a system/apparatus for reducing a data size of a database/data structure stored in a memory of a data transaction processing system 100, which stores a plurality of data records, each of the plurality of data records being characterized by a record data size and storing data indicative of a position (of one or more portfolios) in one or more financial instruments, such as interest rate swaps, futures contracts, etc. The system/apparatus may be referred to as an architecture which enables post-trade processing of portfolio/position databases/data structures, or subsets thereof, to reduce the data size thereof for storage, communication and/or processing and may further reduce other aspects or characteristics such as gross notional value, total risk, etc. More particularly, the disclosed embodiments implement a compression module 122 which, as described above, may be a part of the exchange computer system 100 or an adjunct service provided thereto, and which processes a select subset of data records to effect an optimized reduction thereof as described.

It will be appreciated that the disclosed system/apparatus may be implemented by the exchange computer system 100 and include compression module 122, describe above with respect to FIG. 1, which may be a separate module or a part (as a distinct module or the functionality therefor) of the Clearing House Systems 124, Settlement Module 120, or other module of the exchange computing system 100 described above and shown in FIG. 1. The system includes a processor, and a non-transitory memory coupled therewith, such as the processor 202, memory 204, described in detail above with reference to FIG. 2. A user interface (not shown) may be provided for the purpose of receiving one or more of the parameters or constraints described herein from a user, such as one or more of traders/market participants whose position are undergoing the disclosed reduction process, or from an administrator of the exchange computer system 100.

Example Embodiments

Figure 5:
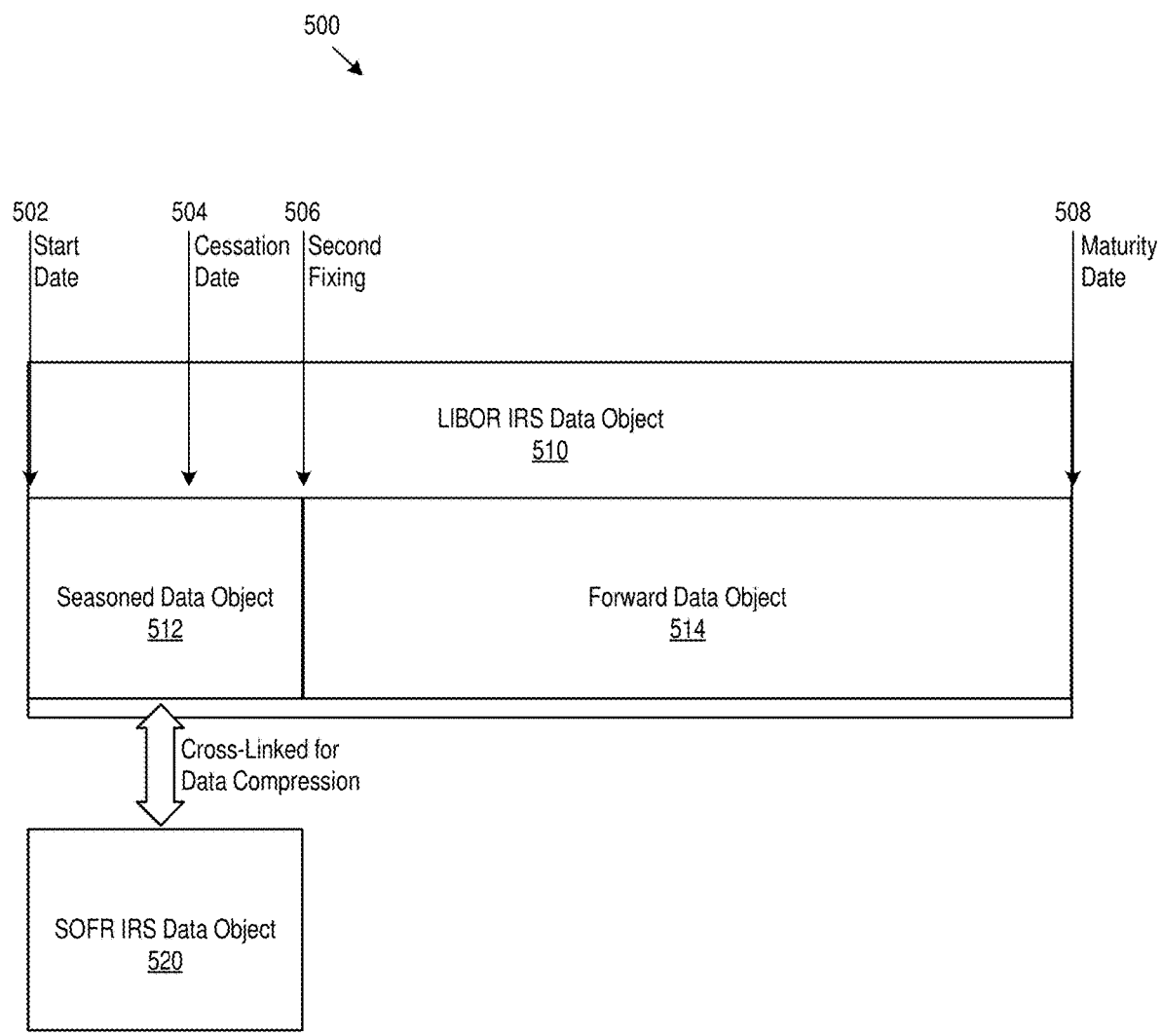
FIG. 5 depicts a block diagram of an illustrative example of a data compression event according to various embodiments.

Referring now to FIG. 5, block diagram showing an example LIBOR based IRS data compression event 500 is shown. In the example LIBOR based IRS data compression event 500, an existing LIBOR based IRS data object 510 is divided into two data objects, a seasoned data object 512 with a start date 502 prior to the cessation date 504 of LIBOR and a forward data object 514 based on a second fixing date 506 allowing division of the LIBOR based IRS data object 510 into the two data objects. Thus, the second fixing date 506 (in the future) becomes the new start date of the forward data object 514 (which extends to the original maturity date 508) and the second fixing date 506 also becomes the new maturity date of the seasoned data object 512.

Data compression may be applied to either or both of the seasoned data object and/or the forward data object 514. However, in the illustrative example herein, compression as applied to the seasoned data object 512 will be discussed.

The example seasoned data object 512 has an associated cash flow which it defines. The second fixing date 506 may be selected to be coupon settlement date (e.g., the next coupon settlement date) of the original LIBOR based IRS that was divided into the seasoned data object 512 and the forward data object 514. Accordingly, the seasoned data object 512, with its new maturity date at the original second fixing date 506, may correspond to a short dated LIBOR IRS with a start date in the past. The seasoned data object 512 may be matched to a SOFR-referencing IRS data object 520 with a cashflow matching that defined by the seasoned data object 512. The resultant offset the SOFR-referencing IRS data object and the offset seasoned data object 512 are then removed (e.g., forced to terminate) to effect the data compression.

In various embodiments, the techniques and architectures discussed herein, may facilitate offsets and assist participants to closeout existing positions. In some cases, participants may identify LIBOR positions/trade to closeout and calculates the net coupon to be settled. The participant may execute a SOFR OIS with $1 notional value. The SOFR OIS may have an upfront fee which is equal to the net coupon amount settling on the maturity date of the LIBOR position. The SOFR OIS may be required, e.g., via the cross-linking to carry attributes (e.g., Effective Date, Maturity Date, Roll Day, Calendar conventions) similar to the LIBOR swap intended to offset. After the data objects for the swaps are identified, the objects may be locked to one another, which may include checks of the attribute matching, execution amount (e.g., upfront fee), and/or other values, such as net present value and/or other values. To effect the data compression the trade may net, terminate and be removed. This may allow for participants to remove legacy data object, e.g., representing LIBOR swaps, to close the associated positions without waiting for maturity and/or coupon settlement. This may reduce the time that the legacy data object persists as a static data load for up to 6-12 months or more.

Tables 1-6 show example data objects within two illustrative example use cases for data compression.

Illustrative Example 1—One to One Offset and Compression

Party A holds a LIBOR-based Interest Rate Swap (IRS) that presents a static data load. The swap has a final settlement due on Sep. 15, 2023. In this illustrative example swap is cleared with CME Clearing as the counterparty. Table 1 shows an example legacy data object for the LIBOR swap.

TABLE 1

| Legacy Data Object for LIBOR Swap | |
|---|---|
| Trade ID | 1001 |
| Product Type | Interest Rate Swap |
| Currency | USD |
| Floating Index | USD-LIBOR |
| Start Date | Sep. 15, 2022 |
| End Date | Sep. 15, 2023 |
| Notional | $100M USD |
| Direction | Pay Fixed |
| Fixed Rate | 7% |
| Fixed Payment Frequency | 6M |
| Float Payment Frequency | 3M |

On Jun. 15, 2023 the final LIBOR fixing rate for this IRS is reset and the last coupon payments are known, payable on Sep. 15, 2023.

Final Coupon Amount = Float Coupon − Fixed Coupon $$= (100M \times 92/360 \times 5.5\%) - (100M \times 180/360 \times 7\%)$$

$$= 1,788,500.00 - 3,500,000.00$$

$$= -1,711,500.00$$

USD-LIBOR undergoes a cessation event on Jun. 30, 2023. Regulators prohibit the publication of new LIBOR rates and new derivatives trading for certain parties referencing LIBOR rates. In July 2023, Party A is unable to remove the static data load associated with the LIBOR-based IRS data object.

Party A executes a SOFR Overnight Index Swap (OIS) with Party C that offsets the cash flows from the original LIBOR swap. In the illustrative example, this swap is then cleared and Party A presents the offsetting data objects to an exchange system for compression via cross-linking and removal.

TABLE 2

| Example Non-Legacy Data Object for SOFR One-to-One Offset Swap | |
|---|---|
| Trade ID | 1002 |
| Product Type | Overnight Index Swap |
| Currency | USD |
| Floating Index | USD-SOFR-OIS Compound |
| Start Date | Sep. 15, 2022 |
| End Date | Sep. 15, 2023 |
| Notional | $1 USD |
| Direction | Rec Fixed |
| Fixed Rate | 7% |
| Fixed Payment Frequency | 6M |
| Float Payment Frequency | 3M |
| Upfront Fee | 1,711,500.00* |
| Upfront Fee Date | Sep. 15, 2023 |

*Fee Amount = Net Coupon due to settle on LIBOR.

After both trades are cleared, the exchange system may determine, e.g., using DCL 400, if trades are eligible to offset. The exchange system will consider trades 1001 and 1002 as fully offsetting since all remaining cash flows are known and offset:

Net Cash Flow on Sep. 15, 2023=1,711,500.00−1,711,500.00=0

Both trades are terminated resulting in zero open positions for Party A.

Illustrative Example 2—Many to One Offset and Compression

Party A holds a basket of LIBOR-based Interest Rate Swaps (IRS) that all have maturity dates on Aug. 1, 2023. These swaps are cleared into the same account with for the exchange system. Tables 3-5 show example legacy data objects for the multiple LIBOR swaps in the basket.

TABLE 3

| Legacy Data Object for LIBOR Swap | |
|---|---|
| Trade ID | 2001 |
| Product Type | Interest Rate Swap |
| Currency | USD |
| Floating Index | USD-LIBOR |
| Start Date | Aug. 1, 2022 |
| End Date | Aug. 1, 2023 |
| Notional | $100M USD |
| Direction | Pay Fixed |
| Fixed Rate | 8% |
| Fixed Payment Frequency | 6M |
| Float Payment Frequency | 3M |

TABLE 4

| Legacy Data Object for LIBOR Swap | |
|---|---|
| Trade ID | 2002 |
| Product Type | Interest Rate Swap |
| Currency | USD |
| Floating Index | USD-LIBOR |
| Start Date | May 1, 2023 |
| End Date | Aug. 1, 2023 |
| Notional | $100M USD |
| Direction | Rec Fixed |
| Fixed Rate | 6% |
| Fixed Payment Frequency | 3M |
| Float Payment Frequency | 3M |

TABLE 5

| Legacy Data Object for LIBOR Swap | |
|---|---|
| Trade ID | 2003 |
| Product Type | Interest Rate Swap |
| Currency | USD |
| Floating Index | USD-LIBOR |
| Start Date | Feb. 1, 2023 |
| End Date | Aug. 1, 2023 |

TABLE 5-continued

Legacy Data Object for LIBOR Swap

| | |
|---|---|
| Notional | $50M USD |
| Direction | Pay Fixed |
| Fixed Rate | 5% |
| Fixed Payment Frequency | 6M |
| Float Payment Frequency | 3M |

The final LIBOR fixing rates are published at the start of the last coupon period for each respective swap. All coupon amounts are known, and payable on Aug. 1, 2023.
Final Coupon Amounts
  Trade ID 2001=(1,339,504.83−4,000,000.00)=−2,660,495.17
  Trade ID 2002=(2,000,000.00−1,354,224.67)=645,775.33
  Trade ID 2003=(669,752.42−1,250,000)=−580,247.58
  Total=2,594,967.42

USD-LIBOR undergoes a cessation event on Jun. 30, 2023. Regulators prohibit the publication of new LIBOR rates and new derivatives trading for certain parties referencing LIBOR rates. In July 2023, Party A is unable to remove the static data load associated with the basket of LIBOR-based IRS data objects.

Party A executes a SOFR Overnight Index Swap (OIS) that offsets the net cash flow from the original LIBOR swaps and Party A presents the offsetting data objects to an exchange system for compression via cross-linking and removal.

TABLE 6

Example Non-Legacy Data Object for SOFR Many-to-One Offset Swap

| | |
|---|---|
| Trade ID | 2004 |
| Product Type | Overnight Index Swap |
| Currency | USD |
| Floating Index | USD-SOFR-OIS Compound |
| Start Date | May 1, 2023 |
| End Date | Aug. 1, 2023 |
| Notional | $1 USD |
| Direction | Rec Fixed |
| Fixed Rate | 1% |
| Fixed Payment Frequency | 3M |
| Float Payment Frequency | 3M |
| Upfront Fee | −2,594,967.42 |
| Upfront Fee Date | 8/1/2023 |

After both trades are cleared the exchange system may determine, e.g., using DCL 400, if trades are eligible to offset. The exchange system will consider trades 2001, 2002, and 2003 as fully offsetting with trade 2004 since all remaining cash flows are known and offset:

Net Cash Flow on Aug. 1, 2023=2,594,967.42−2,594,967.42=0

Various implementations have been described. Other implementations are possible. Table 7 includes various examples.

TABLE 7

Examples

1. A system including:
   a processor; and
   a non-transitory memory configured to store:
     a non-legacy data structure;
     a legacy data structure; and
     instructions that when executed by the processor cause the processor to:
       identify a participant data object defining a participant flow for participant, wherein the participant flow includes a non-legacy flow referenced to an active rate index;
       when the participant flow is identical in magnitude and opposite in polarity to a net legacy flow associated with one or more legacy data objects associated with the participant, the net legacy flow referenced to an inactive rate index:
         compress the participant data object and the one or more legacy data objects via:
           execution of a cross-linking of the participant data object with the one or more legacy data objects, the cross-linking including locking the participant data object to the one or more legacy data objects across the non-legacy data structure and the legacy data structure; and
           removal, responsive to the cross-linking, of the participant data object from the non-legacy data structure and the one or more legacy data objects from the legacy data structure.
2. The system of example 1 or any other example in this table, wherein a start date for each of the one or more legacy data objects occurred before the inactive rate index became inactive.
3. The system of example 1 or any other example in this table, wherein each of one or more legacy data objects have an identical flow execution date.
4. The system of example 1 or any other example in this table, wherein the participant data object is characterized by a nominal notional amount to obviate a multi-step flow magnitude evaluation.
5. The system of example 1 or any other example in this table, wherein at least one of the one or more legacy data objects includes a short-dated remainder data object resulting from compression of a long-dated legacy data object.

TABLE 7-continued

Examples

6. The system of example 1 or any other example in this table, wherein the participant flow corresponds to an upfront fee with a magnitude equal to the magnitude of the net legacy flow, the upfront fee defined within the participant data object.
7. The system of example 1 or any other example in this table, wherein the participant data object defines one or more legs of an interest rate swap for the participant and the participant flow includes a cashflow for the interest rate swap.
8. The system of example 7 or any other example in this table, wherein the participant data object is generated along with a counter data object that defines one or more legs of the interest rate swap for a counter party.
9. The system of example 1 or any other example in this table, wherein the participant flow includes a net non-legacy flow defined by a plurality of non-legacy data objects including the participant data object.
10. A computer-implemented method for data compression, the method including:
   identifying, by a processor, a participant data object defining a participant flow for participant, wherein the participant flow includes a non-legacy flow referenced to an active rate index;
   when the participant flow is identical in magnitude and opposite in polarity to a net legacy flow associated with one or more legacy data objects associated with the participant, the net legacy flow referenced to an inactive rate index:
      compressing the participant data object and the one or more legacy data objects by:
         executing, by the processor, a cross-linking of the participant data object with the one or more legacy data objects, the cross-linking including locking the participant data object to the one or more legacy data objects across a non-legacy data structure and a legacy data structure; and
         removing, by the processor and responsive to the cross-linking, the participant data object from the non-legacy data structure stored in memory and the one or more legacy data objects from a legacy data structure stored in the memory.
11. The computer-implemented method of example 10 or any other example in this table, wherein a start date for each of the one or more legacy data objects occurred before the inactive rate index became inactive.
12. The computer-implemented method of example 10 or any other example in this table, wherein each of one or more legacy data objects have an identical flow execution date.
13. The computer-implemented method of example 10 or any other example in this table, wherein the participant data object is characterized by a nominal notional amount to obviate a multi-step flow magnitude evaluation.
14. The computer-implemented method of example 10 or any other example in this table, wherein at least one of the one or more legacy data objects includes a short-dated remainder data object resulting from compression of a long-dated legacy data object.
15. The computer-implemented method of example 10 or any other example in this table, wherein the active rate index includes the Secured Financing Overnight Rate (SOFR) and the inactive rate index includes the London Interbank Offered Rate (LIBOR).
16. The computer-implemented method of example 10 or any other example in this table, wherein the participant data object defines one or more legs of an interest rate swap for the participant and the participant flow includes a cashflow for the interest rate swap.
17. The computer-implemented method of example 16 or any other example in this table, wherein the participant data object is generated along with a counter data object that defines one or more legs of the interest rate swap for a counter party.
18. The computer-implemented method of example 10 or any other example in this table, wherein the participant flow includes a net non-legacy flow defined by a plurality of non-legacy data objects including the participant data object.
19. A system for data compression, the system including:
   means for identifying, by a processor, a participant data object defining a participant flow for participant, wherein the participant flow includes a non-legacy flow referenced to an active rate index;
   means for compressing, when the participant flow is identical in magnitude and opposite in polarity to a net legacy flow associated with one or more legacy data objects associated with the participant, the participant data object and the one or more legacy data objects, the net legacy flow referenced to an inactive rate index the means for compressing including:
      means for executing a cross-linking of the participant data object with the one or more legacy data objects, the cross-linking including locking the participant data object to the one or more legacy data objects across a non-legacy data structure and a legacy data structure; and

TABLE 7-continued

Examples means for removing, responsive to the cross-linking, the participant data object from the non-legacy data structure stored in memory and the one or more legacy data objects from a legacy data structure stored in the memory.

20. The system of example 19 or any other example in this table, wherein the participant data object defines one or more legs of an interest rate swap for the participant and the participant flow includes a cashflow for the interest rate swap.
21. A system including a processor configured to perform the method of any other example in the table.
22. A product including:
a machine-readable medium; and
instructions stored on the machine-readable medium, the instructions configured to cause a processor to perform the method of any other example in the table, where:
  optionally, the instructions are executable;
  optionally, the machine-readable medium is non-transitory;
    optionally, the machine-readable medium is other than a transitory signal.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the disclosed embodiments or of what may be claimed, but rather as descriptions of features specific to particular embodiments of the disclosed embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:
1. A system including:
a processor; and
a non-transitory memory configured to store:
  a non-legacy data structure;
  a legacy data structure; and
  instructions that, when executed by the processor, cause the processor to:

identify a participant data object defining a participant flow for participant, wherein the participant flow includes a non-legacy flow referenced to an active rate index;

when the participant flow is identical in magnitude and opposite in polarity to a net legacy flow associated with one or more legacy data objects associated with the participant, the net legacy flow referenced to an inactive rate index:

compress the participant data object and the one or more legacy data objects via:

execution of a cross-linking of the participant data object with the one or more legacy data objects, the cross-linking including locking the participant data object to the one or more legacy data objects across the non-legacy data structure and the legacy data structure; and removal, responsive to the cross-linking, of the participant data object from the non-legacy data structure and the one or more legacy data objects from the legacy data structure.

2. The system of claim 1, wherein a start date for each of the one or more legacy data objects occurred before the inactive rate index became inactive.

3. The system of claim 1, wherein each of one or more legacy data objects have an identical flow execution date.

4. The system of claim 1, wherein the participant data object is characterized by a nominal notional amount to obviate a multi-step flow magnitude evaluation.

5. The system of claim 1, wherein at least one of the one or more legacy data objects includes a short-dated remainder data object resulting from compression of a long-dated legacy data object.

6. The system of claim 1, wherein the participant flow corresponds to an upfront fee with a magnitude equal to the magnitude of the net legacy flow, the upfront fee defined within the participant data object.

7. The system of claim 1, wherein the participant data object defines one or more legs of an interest rate swap for the participant and the participant flow includes a cashflow for the interest rate swap.

8. The system of claim 7, wherein the participant data object is generated along with a counter data object that defines one or more legs of the interest rate swap for a counter party.

9. The system of claim 1, wherein the participant flow includes a net non-legacy flow defined by a plurality of non-legacy data objects including the participant data object.

10. A computer-implemented method for data compression, the method including:

identifying, by a processor, a participant data object defining a participant flow for participant, wherein the participant flow includes a non-legacy flow referenced to an active rate index;

when the participant flow is identical in magnitude and opposite in polarity to a net legacy flow associated with one or more legacy data objects associated with the participant, the net legacy flow referenced to an inactive rate index:

compressing the participant data object and the one or more legacy data objects by:

executing, by the processor, a cross-linking of the participant data object with the one or more legacy data objects, the cross-linking including locking the participant data object to the one or more legacy data objects across a non-legacy data structure stored in memory and a legacy data structure stored in the memory; and removing, by the processor and responsive to the cross-linking, the participant data object from the non-legacy data structure stored in memory and the one or more legacy data objects from the legacy data structure stored in the memory.

11. The computer-implemented method of claim 10, wherein a start date for each of the one or more legacy data objects occurred before the inactive rate index became inactive.

12. The computer-implemented method of claim 10, wherein each of one or more legacy data objects have an identical flow execution date.

13. The computer-implemented method of claim 10, wherein the participant data object is characterized by a nominal notional amount to obviate a multi-step flow magnitude evaluation.

14. The computer-implemented method of claim 10, wherein at least one of the one or more legacy data objects includes a short-dated remainder data object resulting from compression of a long-dated legacy data object.

15. The computer-implemented method of claim 10, wherein the active rate index includes the Secured Financing Overnight Rate (SOFR) and the inactive rate index includes the London Interbank Offered Rate (LIBOR).

16. The computer-implemented method of claim 10, wherein the participant data object defines one or more legs of an interest rate swap for the participant and the participant flow includes a cashflow for the interest rate swap.

17. The computer-implemented method of claim 16, wherein the participant data object is generated along with a counter data object that defines one or more legs of the interest rate swap for a counter party.

18. The computer-implemented method of claim 10, wherein the participant flow includes a net non-legacy flow defined by a plurality of non-legacy data objects including the participant data object.

19. A system for data compression, the system including:

means for identifying a participant data object defining a participant flow for participant, wherein the participant flow includes a non-legacy flow referenced to an active rate index;

means for compressing, when the participant flow is identical in magnitude and opposite in polarity to a net legacy flow associated with one or more legacy data objects associated with the participant, the participant data object and the one or more legacy data objects, the net legacy flow referenced to an inactive rate index the means for compressing including:

means for executing a cross-linking of the participant data object with the one or more legacy data objects, the cross-linking including locking the participant data object to the one or more legacy data objects across a non-legacy data structure stored in memory and a legacy data structure stored in the memory; and means for removing, responsive to the cross-linking, the participant data object from the non-legacy data structure stored in memory and the one or more legacy data objects from the legacy data structure stored in the memory.

20. The system of claim 19, wherein the participant data object defines one or more legs of an interest rate swap for the participant and the participant flow includes a cashflow for the interest rate swap.

* * * * *